(12) United States Patent
Okubo et al.

(10) Patent No.: US 7,233,311 B2
(45) Date of Patent: *Jun. 19, 2007

(54) DIGITAL DISPLAY APPARATUS FOR VEHICLE AND METHOD OF DISPLAYING INFORMATION

(75) Inventors: Yasuhiro Okubo, Isehara (JP); Seiji Hayashi, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 590 days.

This patent is subject to a terminal disclaimer.

(21) Appl. No.: 10/743,541

(22) Filed: Dec. 23, 2003

(65) Prior Publication Data

US 2004/0189447 A1   Sep. 30, 2004

(30) Foreign Application Priority Data

Dec. 27, 2002 (JP) .............................. 2002-382304

(51) Int. Cl.
G09G 3/34 (2006.01)

(52) U.S. Cl. ....................... 345/108; 359/292; 362/464

(58) Field of Classification Search ................ 345/108; 362/464, 465, 466; 359/290–292; 340/425.5
See application file for complete search history.

(56) References Cited

U.S. PATENT DOCUMENTS 5,526,951 A   6/1996  Bailey et al.
5,938,319 A   8/1999  Hege
6,188,933 B1 * 2/2001  Hewlett et al. ................ 700/19
6,459,387 B1 * 10/2002 Kobayashi et al. ......... 340/988
6,527,425 B1   3/2003  Nakata
6,969,183 B2 * 11/2005 Okubo et al. ................ 362/466

FOREIGN PATENT DOCUMENTS

| DE | 195 30 008 A1 | 2/1997 |
| JP | 60022541 A * | 2/1985 |
| JP | 8-201708 A | 8/1996 |
| JP | 9-104288 A | 4/1997 |
| JP | 11-231234 A | 8/1999 |
| JP | 2001-35215 A | 2/2001 |

* cited by examiner

Primary Examiner—Amr A. Awad
Assistant Examiner—Tom V. Sheng
(74) Attorney, Agent, or Firm—Foley & Lardner LLP

(57) ABSTRACT

A digital display apparatus for a vehicle includes an optical engine that includes a light source, a reflection type digital light deflector that has a plurality of micro mirror elements, a light irradiation unit that irradiates reflected light from the reflection type digital light deflector on a road surface and the like, and an information display unit. The reflection type digital light deflector digitally switches over a direction of reflection of a light from the optical engine between an ON and an OFF state. The information display unit displays information using a contrast between the ON reflected light and an OFF reflected light from the reflection type digital light deflector on the road surface and the like through the light irradiation unit.

20 Claims, 17 Drawing Sheets

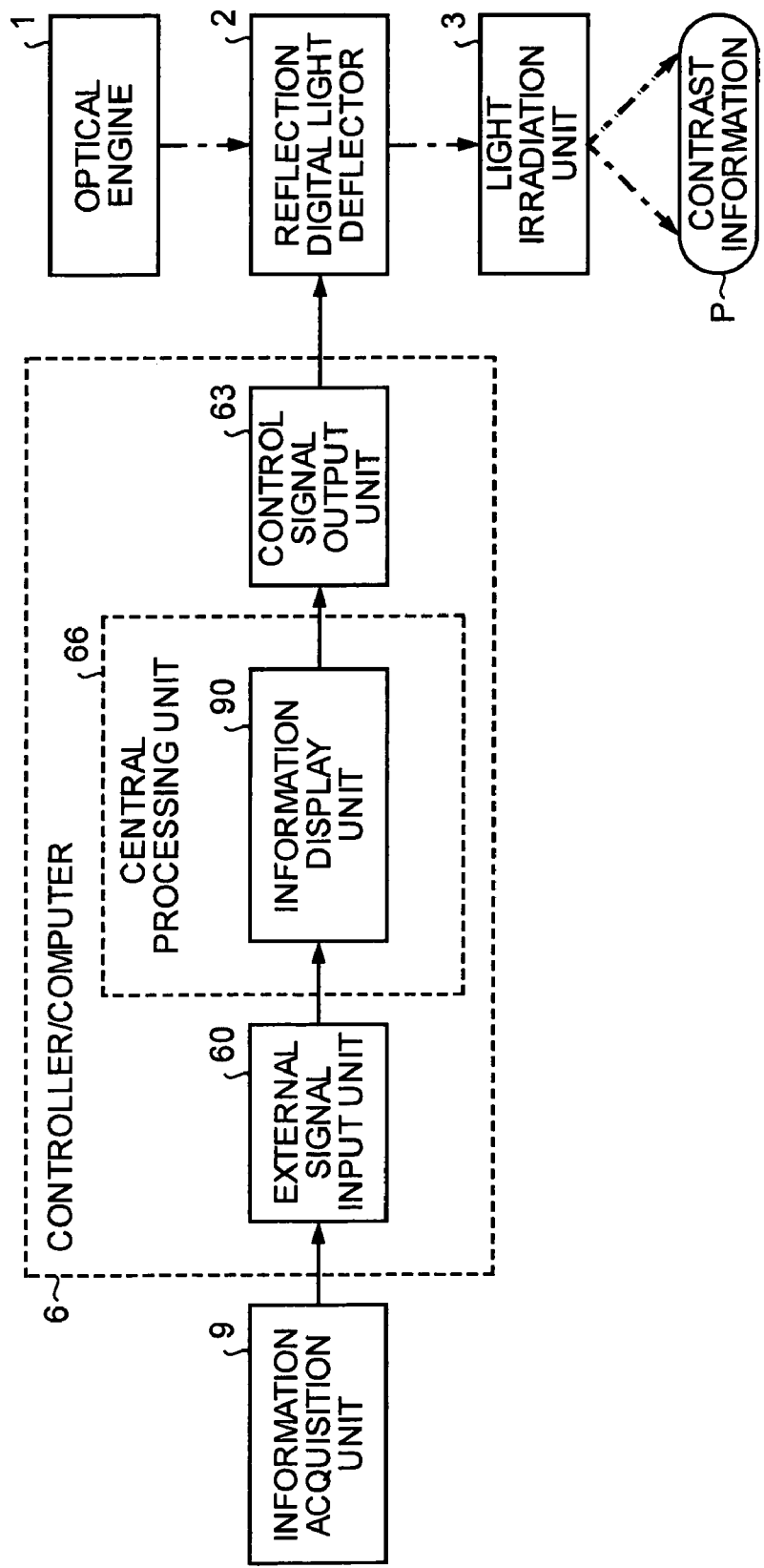

DIGITAL DISPLAY APPARATUS FOR VEHICLE AND METHOD OF DISPLAYING INFORMATION

CROSS-REFERENCE TO RELATED APPLICATIONS

The present document Incorporates by reference the entire contents of Japanese priority document, 2002-382304 filed in Japan on Dec. 27, 2002.

BACKGROUND OF THE INVENTION

1) Field of the Invention

The present invention relates to a digital display apparatus for a vehicle and a method of displaying information for the digital display apparatus.

2) Description of the Related Art

Throughout the whole specification, "a road surface and the like" refers to a road surface, a person (such as a pedestrian), and objects (such as a preceding vehicle, an oncoming vehicle, road signs, and buildings), etc.

A digital lighting apparatus that illuminates a road surface and the like in a predetermined light distribution pattern using a reflection type digital light deflector is well known. The digital lighting apparatus of this type is disclosed in, for example, Japanese Patent Application Laid-Open No. 9-104288, German Patent Publication No. DE 195 30 008 A1 or U.S. Pat. No. 5,938,319, and US Patent Publication No. 5938319.

The digital lighting apparatus includes a light source that emits light, a reflector that reflects the light from the light source, and a reflection type light guiding unit that reflects the light from the light source and the reflector. When the light source is turned on, the light emitted from the light source is reflected by the reflector and reflected light is reflected by the reflection type light guiding unit to illuminate the road surface and the like.

However, no digital display apparatus that can display information (information using a contrast between brightness and darkness (light and shadow), e.g., information including at least one of a graphic, a symbol, a letter, a number, a leveling mark, and a mark that indicates width of the vehicle (hereinafter, "a vehicle width mark") on the road surface and the like using a reflection type digital light deflector has been provided.

SUMMARY OF THE INVENTION

It is an object of the present invention to solve at least the problems in the conventional technology.

The digital display apparatus for a vehicle, according to one aspect of the present invention includes an optical engine including a light source, a reflection type digital light deflector that has a plurality of micro mirror elements arranged to be respectively tiltable, that digitally switches a tilt angle of each of the micro mirror elements between a first tilt angle and a second tilt angle to switch a reflection direction of a light from the optical engine between a first reflection direction as an ON state and a second reflection direction as an OFF state, a light irradiation unit that irradiates an ON state light reflected from the reflection type digital light deflector on a road surface, and an information display unit that controls the reflection type digital light deflector, and that displays information using a contrast between the ON state light and an OFF state light reflected from the reflection type digital light deflector on the road surface via the light irradiation unit.

The digital display apparatus for a vehicle, according to another aspect of the present invention includes two optical engines, each of which includes a light source, two reflection type digital light deflectors, each of which has a plurality of micro mirror elements arranged to be respectively tiltable, and digitally switches a tilt angle of each of the micro mirror elements between a first tilt angle and a second tilt angle to switch a reflection direction of light from the optical engines between a first reflection direction as an ON state and a second reflection direction as an OFF state, two light irradiation units, each of which irradiates an ON state light reflected from the reflection type digital light deflectors on a road surface, and an information display unit that controls the reflection type digital light deflectors, and that displays information using a contrast between the ON state light and an OFF state light reflected from the reflection type digital light deflectors on the road surface via the light irradiation units. One of the two reflection digital light deflectors forms the information with the OFF state light under control of the information display unit. Other of the two reflection digital light deflectors forms a non-lighting portion with the OFF state light under control of the information display unit. The information display unit displays the information and the non-lighting portion on the road surface via the light irradiation units 80 that the non-lighting portion surrounds the information.

The method of displaying information for a digital display apparatus for a vehicle that includes two reflection type digital light deflectors, according to still another aspect of the present invention includes steps of calculating a polygon that is a shape of Information to be displayed, outputting the polygon to one of the reflection type digital light deflectors as a first control signal, calculating a first rectangle that surrounds the polygon, calculating a second rectangle that surrounds the first rectangle, outputting the second rectangle to other of the reflection type digital light deflectors as a second control signal, and displaying information that is formed by the one of the reflection type digital light deflectors based on the first control signal and a non-lighting portion formed by the other of the reflection type digital light deflectors based on the second control signal on a road surface so that the non-lighting portion surrounds the information.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 15 is a schematic diagram for illustrating a state in which contrast information is displayed in the predetermined light distribution pattern irradiated on the road surface or the like;

FIG. 22 is a schematic diagram for illustrating a state in which both the contrast information and the non-lighting portion are displayed in the predetermine light distribution pattern that illuminates the road surface and the like;

FIG. 28 is a block diagram of a digital display apparatus according to a second embodiment of the present invention.

DETAILED DESCRIPTION

Figure 1:
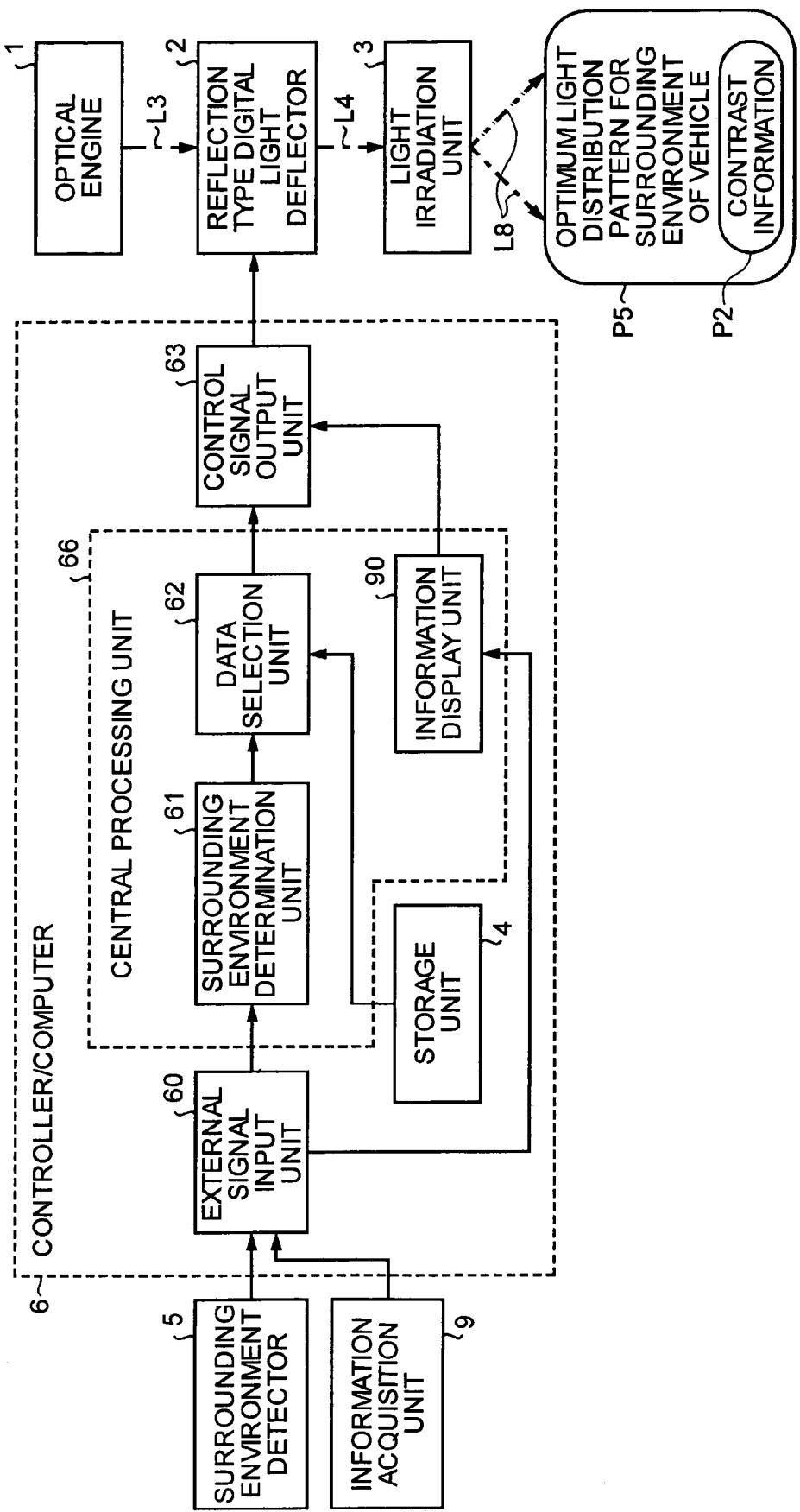
FIG. 1 is a block diagram of a digital display apparatus according to a first embodiment of the present invention.
Figure 2:
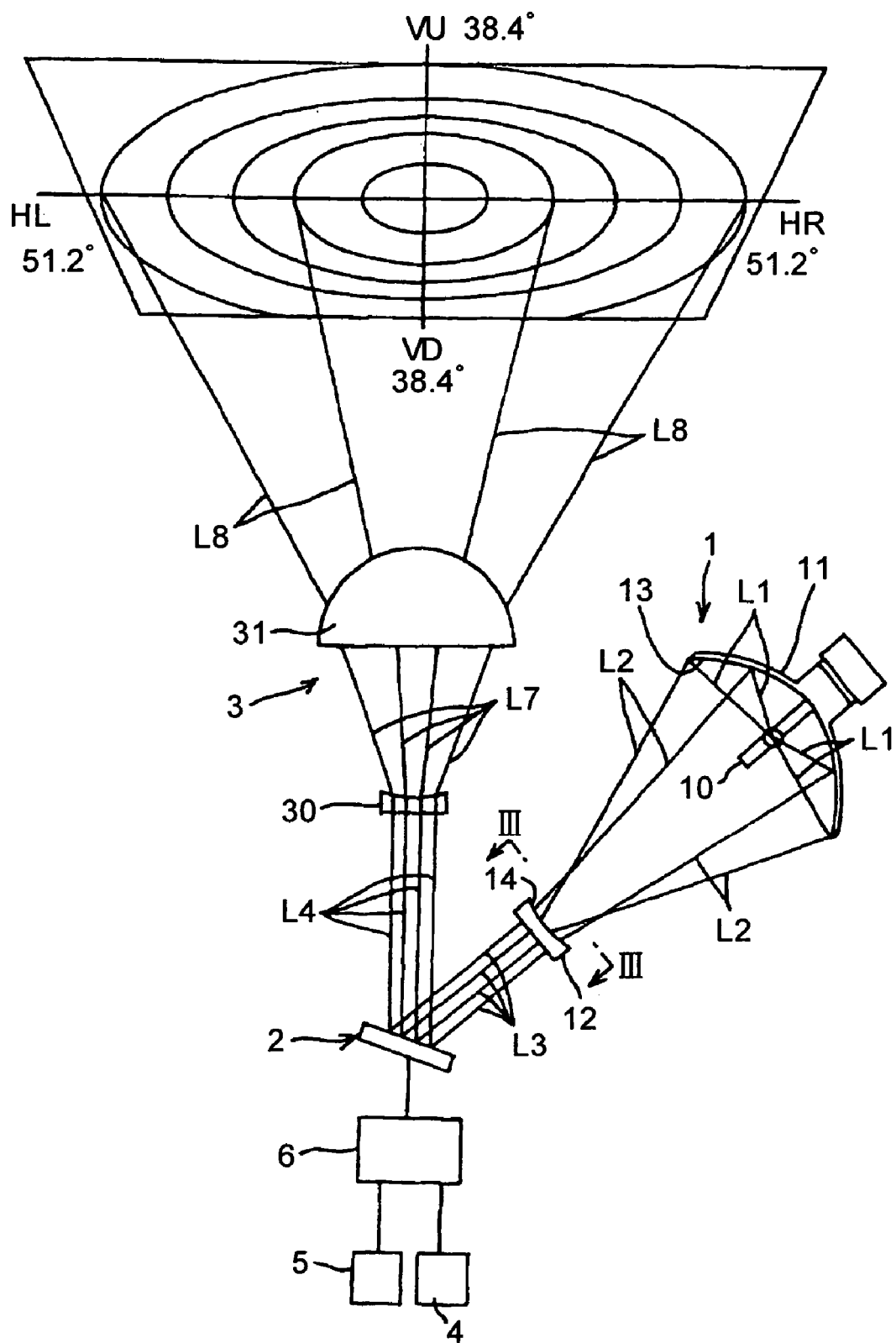
FIG. 2 is a schematic diagram of an optical engine and a light irradiation unit of the digital display apparatus according to the first embodiment.
Figure 3:
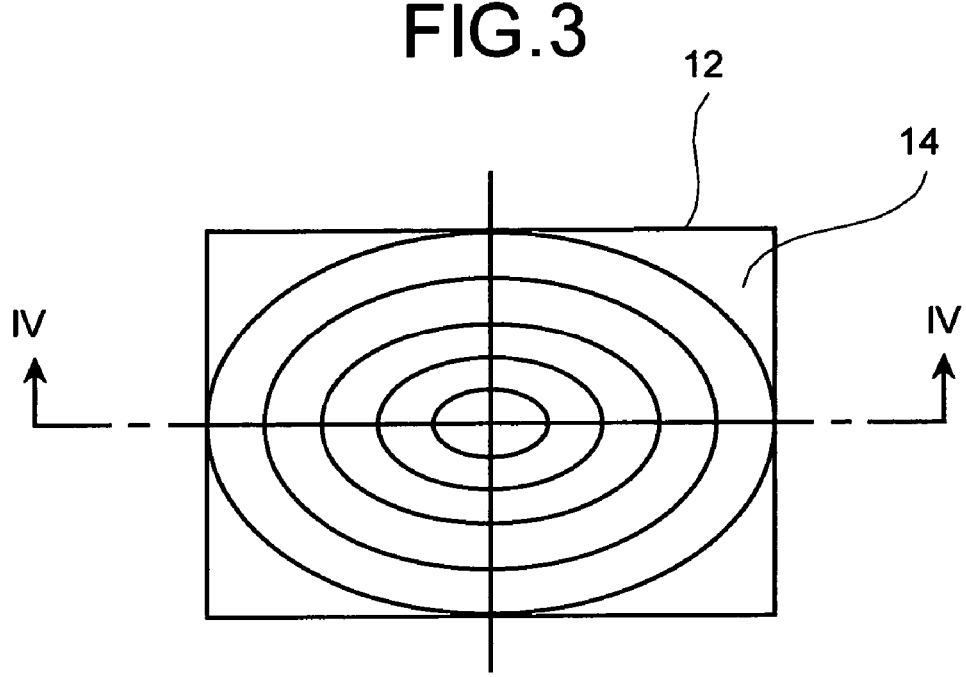
FIG. 3 is an iso-intensity diagram of a luminous intensity distribution of light along a line III—III of FIG. 2.
Figure 4:
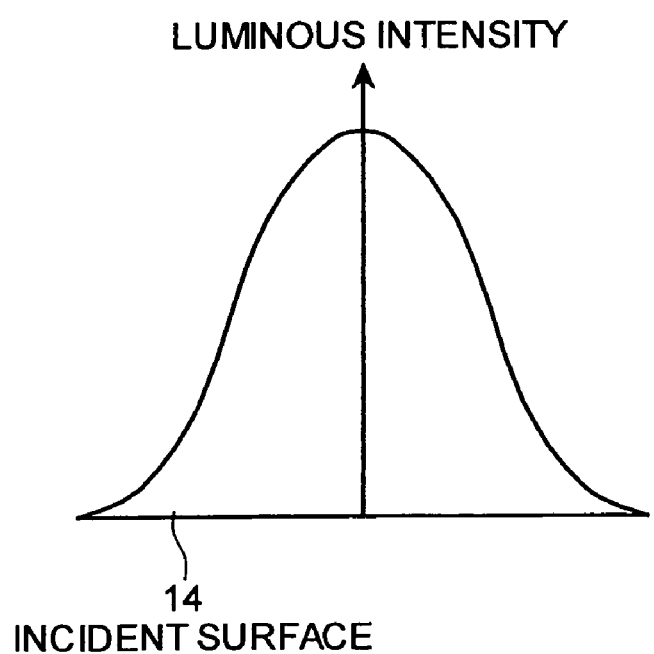
FIG. 4 is a plot of a luminous intensity distribution of the light along a line IV—IV of FIG. 3.
Figure 5:
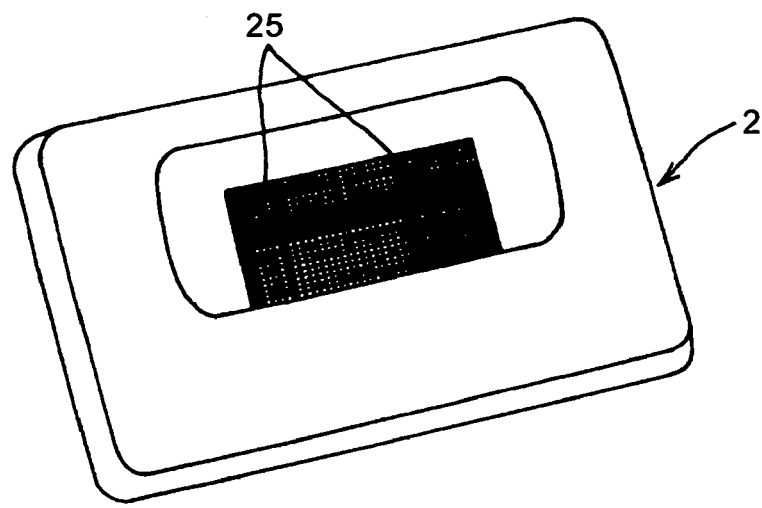
FIG. 5 is a perspective view of a reflection type digital light deflector of the digital display apparatus according to the first embodiment.
Figure 6:
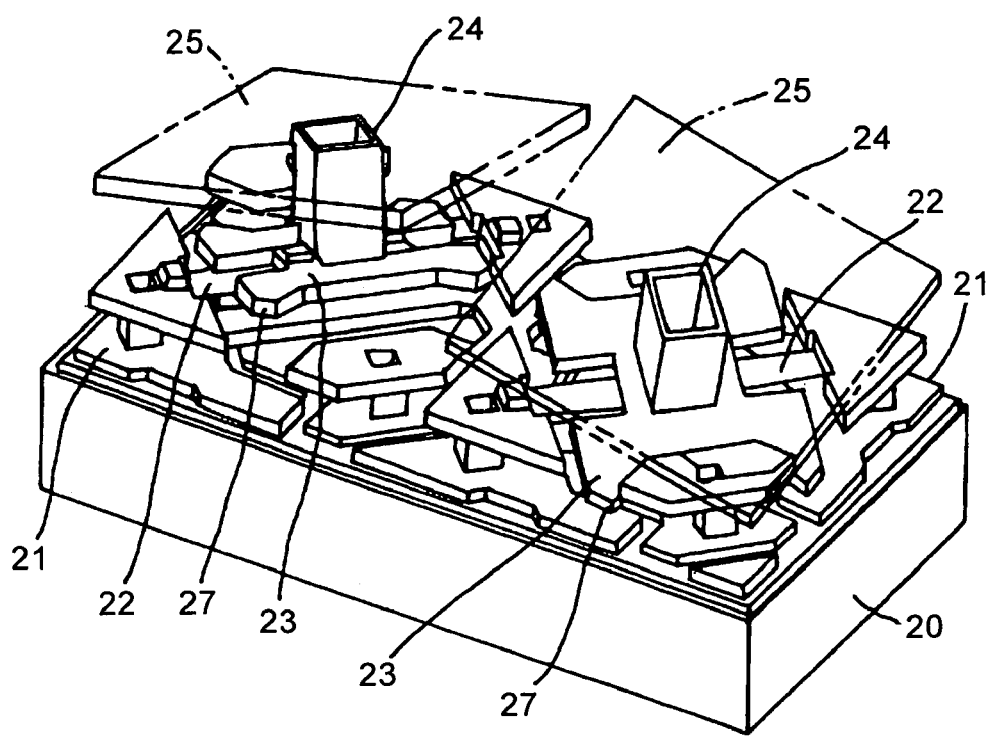
FIG. 6 is a partially enlarged view of the reflection type digital light deflector.
Figure 7:
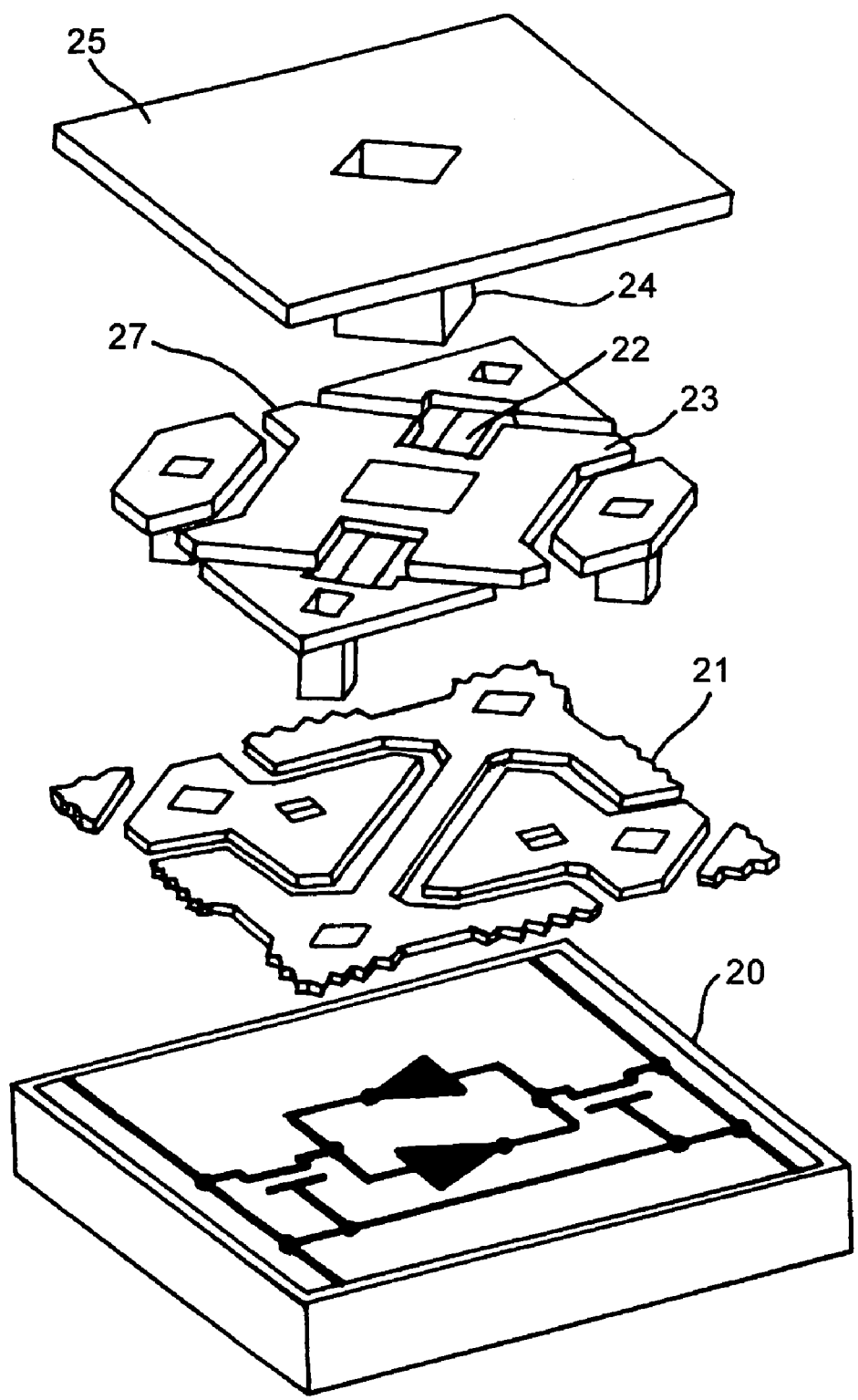
FIG. 7 is a partially enlarged assembly view of the reflection type digital light deflector.
Figures 8, 9:
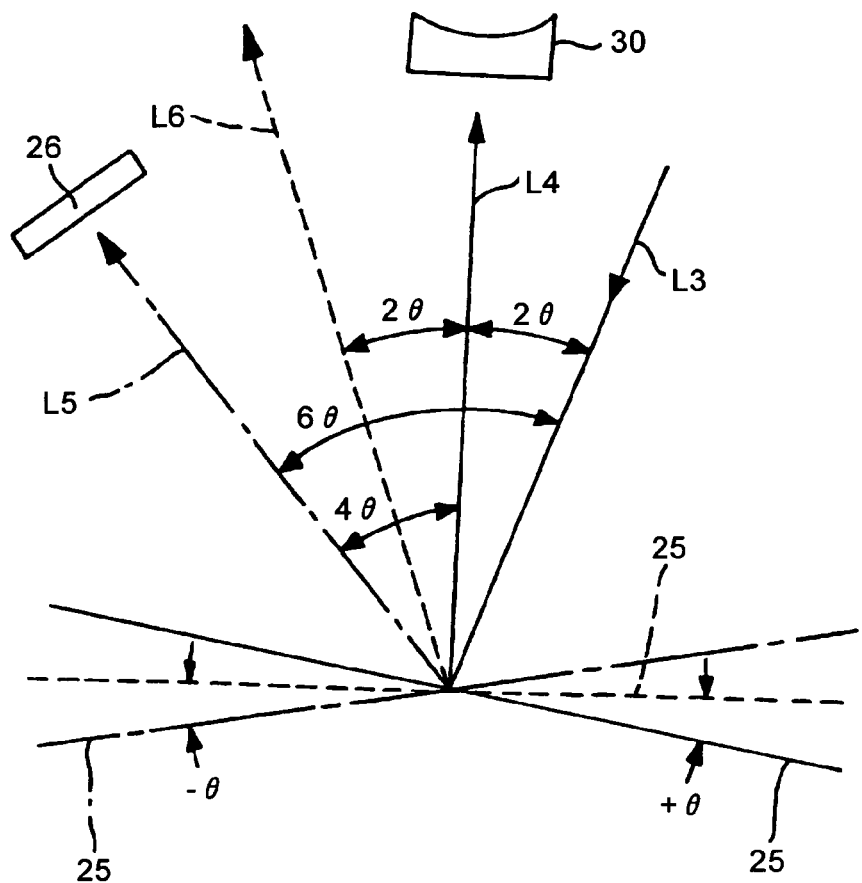
FIG. 8 depicts working of the reflection type digital light deflector.
FIG. 9 is a schematic diagram for illustrating positions of pixels of the reflection type digital light deflector.

Exemplary embodiments of a digital display apparatus for a vehicle and a method of displaying information for the digital display apparatus, according to the present invention are explained in detail with reference to the accompanying drawings. It should be noted that the present invention is not limited to the embodiments.

FIG. 1 to FIG. 23 are Illustrations for the digital display apparatus according to a first embodiment of the present invention. The digital display apparatus according to the first embodiment also functions as a digital lighting apparatus (e.g., a headlamp of a motor vehicle) that illuminates a road surface and the like in a light distribution pattern P5 optimum for an environment surrounding the vehicle. Therefore, the digital display apparatus according to the first embodiment will be explained as the digital lighting apparatus that illuminates the road surface and the like in the light distribution pattern P5 optimum for the environment surrounding the vehicle.

Symbols "VU-VD" and "HL-HR" denote a vertical line of a screen and a horizontal line of the screen, respectively. Symbol "F" denotes a front side of a vehicle C (a traveling direction side of the vehicle C). Symbol "B" denotes a rear side of the vehicle C. Symbol "U" denotes an upper side relative to a driver side. Symbol "D" denotes a lower side relative to the driver side. Symbol "L" denotes a left side if the front side F is viewed from the driver side. Symbol "R" denotes a right side if the front side F is viewed from the driver side.

The digital display apparatus includes an optical engine 1, a reflection type digital light deflector 2, a light irradiation unit 3, a storage unit 4, a surrounding environment detector 5, a controller 6, an information display unit 90, and an information acquisition unit 9. Vehicle digital lighting assemblies each of which includes the optical engine 1, the reflection type digital light deflector 2, and the light irradiation unit 3 are respectively loaded on a left and a right In a front portion of the vehicle at predetermined intervals. The vehicle digital lighting assemblies may not Include the optical engine 1.

The optical engine 1 includes a discharge lamp 10 serving as a light source (output of, for example, 35 watts), a reflector 11 reflecting a light L1 emitted from the discharge lamp 10, and a collimator lens 12 emitting a reflected light L2 from the reflector 11 as a parallel light L3.

An inner surface of the reflector 11 is deposited with aluminum or coated with silver to form a reflection surface 13. The reflection surface 13 is formed out of a NURBS (Non-Uniform Rational B-splines) free-form surface (see Japanese Patent Application Laid-Open No. 2001-35215). The reflection surface 13 makes the reflected light L2 incident on an Incident surface 14 of the collimator lens 12 in a luminous intensity distribution (light distribution) shown in FIG. 3 and FIG. 4. The luminous intensity distribution shown in FIGS. 3 and 4 has a high luminous intensity (illuminance) at a center and a low luminous intensity (illuminance) at a circumference. Therefore, the luminous intensity distribution of the light incident on the incident surface 14 of the collimator lens 12 coincides with the luminous intensity distribution (light distribution) of a vehicle illumination, i.e., a luminous intensity distribution having a high luminous intensity (illuminance) at a center and a low luminous intensity (illuminance) at a circumference. The light L1 emitted from the discharge lamp 10 can be thereby effectively used.

The reflection type digital light deflector 2 (see Japanese Patent Application Laid-Open Nos. 8-201708 and 11-231234) is referred to as "a micro mirror element group digital drive", "a reflection optical modulator", "spatial light modulator", "an optical information processor", "an optical switch", or the like.

The reflection type digital light deflector 2 includes a complementary metal-oxide semiconductor (CMOS) substrate (for a Static random access memory (SRAM) semiconductor) 20, a conductor 21 arranged on the CMOS substrate 20, a yoke 23 arranged on the conductor 21 through a torsion hinge 22 so as to be tiltable, and a micro mirror element 25 supported by the yoke 23 through a post 24. Namely, the reflection type digital light deflector 2 includes a mechanical function, an optical function, and an electric function integrated on one semiconductor chip. The CMOS substrate 20, which serves as a drive section, includes an address transistor. The yoke 23, which serves as a movable section, includes a landing chip (spring chip, or a bouncing chip) 27.

The reflection type digital light deflector 2 has many micro mirror elements 25 arranged in a tiltable manner. The number of the micro mirror elements 25 is, for example, 720×480=345,600, 800×600=480,000, 1,024×768=786,432, 1,280×1,024=1,310,720, or an arbitrary number.

The reflection type digital light deflector 2 digitally switches over a tilt angle of each micro mirror element 25 between a first tilt angle and a second tilt angle and thereby digitally switches over a reflection direction of the parallel light L3 from the collimator lens 12 of the optical engine 1 between ON or a first reflection direction and OFF or a second reflection direction, The reflection type digital light deflector 2 performs a so-called high-speed light switching operation. A state of an orientation of each micro mirror element 25 will be explained in detail with reference to FIG. 8.

If the micro mirror element 25 is turned off, the element 25 is in a horizontal state (neutral state) referred to as "horizontal state" as indicated by a dotted line. If the element 25 is turned on, the element 25 tilts from the horizontal state to a state (ON-state) indicated by a solid line or to a state (OFF-state) indicated by a one-dot chain line by an electrostatic attracting force, depending on an output of the CMOS substrate 20 to an address memory.

The ON-state of,the micro mirror element 25 indicated by the solid line is a state in which the micro mirror element 25 tilts at the first tilt angle +θ (e.g., +10 degrees or +12 degrees) against the horizontal state. The micro mirror element 25 In this ON-state reflects the light L3 from the optical engine 1 in the ON or first reflection direction indicated by a solid-line arrow. A reflected light L4 indicated by this solid-line arrow is reflected at an angle 2θ against the incident light L3 toward the light irradiation unit 3 to thereby illuminate the road surface and the like. The reflected light L4 is an ON reflected light from the reflection type digital light deflector 2.

The OFF-state of the micro mirror element 25 indicated by the one-dot chain line is a state in which the micro mirror element 25 tilts at the second tilt angle −θ(e.g., −10 degrees or −12 degrees) against the horizontal state. The micro mirror element 25 in this OFF-state reflects the light L3 from the optical engine 1 in the OFF or second reflection direction indicated by a one-dot-chain-line arrow. A reflected light L5 indicated by the one-dot-chain-line arrow is reflected at an angle 6θ against the Incident light L3 toward an optical absorber 28 and invalidated. The reflected light L5 is an OFF reflected light from the reflection type digital light deflector 2.

The micro mirror element 25 in the horizontal state reflects the parallel light L3 from the optical engine 3 in a neutral or third reflection direction indicated by a dotted-line arrow. A reflected light L6 indicated by this dotted-line arrow is reflected at an angle 4θ against the incident light L3. The reflected light L6 is a reflected light (neutral reflected light) from the reflection type digital light deflector 2 when the element 25 is turned off.

The reflection type digital light deflector 2 can precisely control the micro mirror elements 25 to emit a full-white color, a full-black color, grays of intermediate multiple gradations (e.g., 256−2=254 gradations for eight bits) one by one according to a control signal output from the controller 6. ON and OFF control over the micro mirror elements 25 (that is, switch over control over the tilt angles of the micro mirror elements 25) will next be explained in detail with reference to FIGS. 9 and 10.

Assuming the micro mirror elements 25 as pixels, positions of the pixels (micro mirror elements 25) in an x direction as 0, 1, 2, 3, 4, . . . , and m, and those of pixels (micro mirror elements 25) in a y direction as 0, 1, 2, . . . , and n, the number of the total micro mirror elements 25 is (m+1)×(n+1). The total number of the micro mirror elements 25 is, for example, 720×480=345,600, 800×600=480,000, 1,024×768=786,432, 1,280×1,024=1,310,720, or an arbitrary number.

It is further assumed as follows. If the control signal output from the controller 6 is "1", each micro mirror element 25 is turned on. If the control signal output from the controller 6 is "0", each micro mirror element 25 is turned off.

While scanning the (m+1)×(n+1) micro mirror elements 25 in order of (0, 0) (1, 0) (2, 0) (3, 0) . . . (m, 0) (0, 1) (1, 1) (2, 1) (3, 1) . . . (m,1) (0, 2) (1, 2) (2, 2) (3, 2) . . . (m, 2) . . . (m, n), each micro mirror element 25 is controlled to be turned on or off according to the control signal "1" or "0" output from the controller 6. As a result, the micro mirror elements 25 are ON and OFF controlled.

Figure 10:
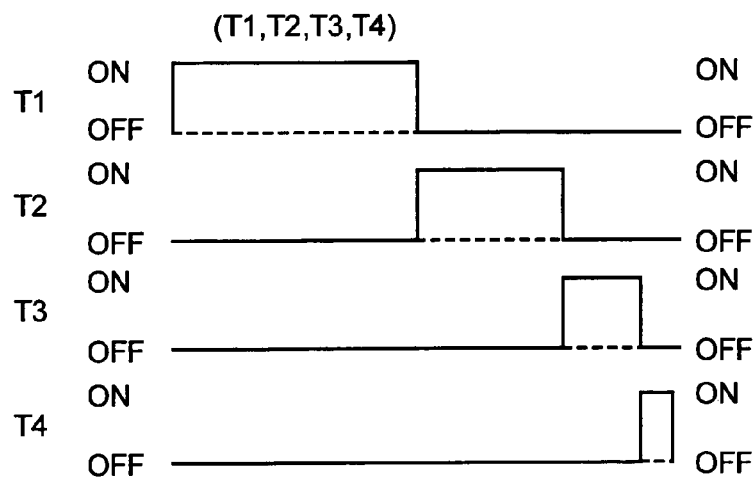
FIG. 10 depicts a pixel control of the reflection type digital light deflector.
Figure 11:
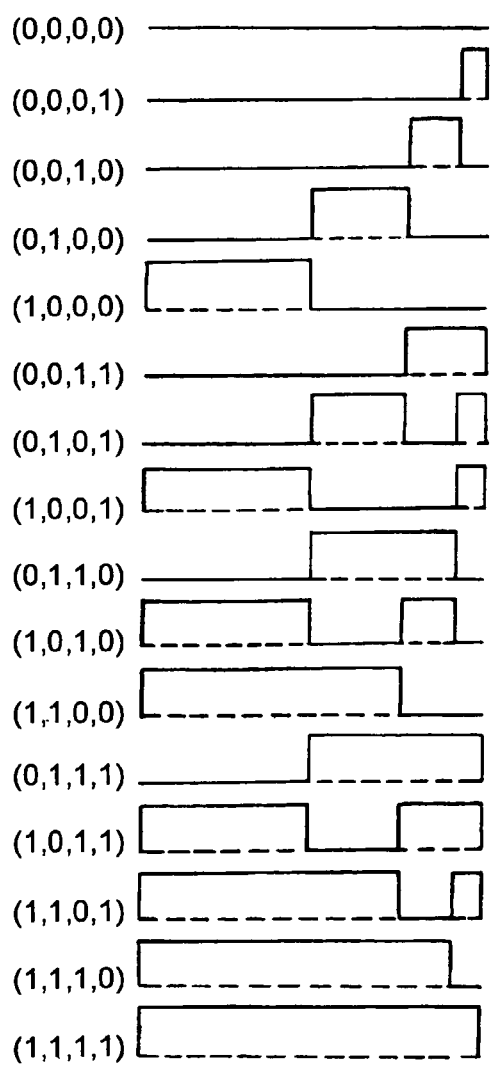
FIG. 11 depicts a 16-gradation control of the reflection type digital light deflector for four-bit data.

The control signal "1" or "0" output from the controller 6 is binary-number bit data. For example, as shown in FIG. 10, if the control signal has four bits (T1, T2, T3, and T4), $2^4$=16 control signals are output. Therefore, It is possible to precisely control full-white color, full-black color, and intermediate colors of gray scale at 16−2=14 gradations of the light. Namely, if the control signal has four bits (T1, T2, T3, and T4), it is possible to precisely control the full-white color of the pixel having a luminous intensity of 100 percent at (1, 1, 1, 1), the full-black color of the pixel having a luminous intensity of zero percent at (0, 0, 0, 0), and the gray colors of the pixels at 14 gradations at (1, 0, 0, 0), (0, 1, 0, 0), (0, 0, 1, 0), (0, 0, 0, 1), (1, 1, 0, 0), (1, 0. 1, 0), (1, 0, 0, 1), (0, 1, 1, 0), (0, 1, 0, 1), (0, 0, 1, 1), (1, 1, 1, 0), (1, 0, 1, 1), (1, 1, 0, 1), and (1,1, 1, 0), If the control signal includes eight bits, the number of pixels that can be controlled is $2^8$=256. Therefore, it is possible to precisely control the full-white color, the full-black color, and the intermediate gray colors at 256−2=256 gradations of the light.

As can be Been, the reflection type digital light deflector 2 controls the reflected light from each micro mirror element 25 to be turned on at a certain time to emit white and to be turned off at remaining time to emit black within a certain time while taking advantage of pulse width modulation according to gradation. If so, a person's vision senses the integrated white time as gradations (e.g., 0 to 255 gray scales for eight bits). Therefore, by controlling the ON-time per unit time, the reflection type digital light deflector 2 realizes a shade of light (luminous intensity difference and illuminance difference) in the light distribution pattern.

The light irradiation unit 3 includes a divergent lens 30 that diverges the ON light L4 from the reflection type digital light deflector 2 and a condensing lens (projection lens) 31 that irradiates an emission light L7 from the divergent lens 30 on the road surface and the like as a Irradiation light L8.

The storage unit 4 is, for example, an internal storage unit (a magnetic disk such as a hard disk or a semiconductor storage unit such as a RAM or a ROM included in a computer or an external storage unit (an optical storage medium such as a CD-ROM or a semiconductor storage medium such as a memory card) exterior to the computer. The storage unit 4 stores digital data on a plurality of light distribution patterns.

The digital data on the light distribution patterns stored in the storage unit 4 is divided in units of regions or countries in which the vehicle is driven. By doing so, an optimum light distribution pattern for road conditions of the region or country where the vehicle is driven can be obtained without changing the overall vehicle lighting apparatus. Therefore, it is unnecessary to optically design or manufacture the vehicle lighting apparatus for each region or country, thereby reducing a manufacturing cost of the vehicle lighting apparatus accordingly.

The optimum light distribution pattern for the road conditions of the region or country where the vehicle is driven means a light distribution pattern optimum for the road conditions in Japan or that for the road conditions in the US. That is, Japan is a left-hand side drive country and has many narrow crossing roads and many twisty roads. Therefore, the optimum light distribution pattern for the road conditions of left-hand traffic and many narrow crossing roads and twisty roads is the optimum light distribution pattern for the Japan's road conditions. On the other hand, the US is a right-hand side drive country and has many wide, straight roads. Therefore, the optimum light distribution pattern for the road conditions of right-hand traffic and many wide, straight roads is the optimum light distribution pattern for the US road conditions.

The light distribution patterns include, for example, a light distribution pattern for a vehicle passing-by the other vehicle, that for a moving vehicle, that for general roads, that for highways, that for urban districts, that for suburbs, that for straight roads, that for curved roads, that for crossings, that for mountain paths, that for winding roads, that for rainy weather, that for foggy weather, and that for snowy weather.

Figure 12:
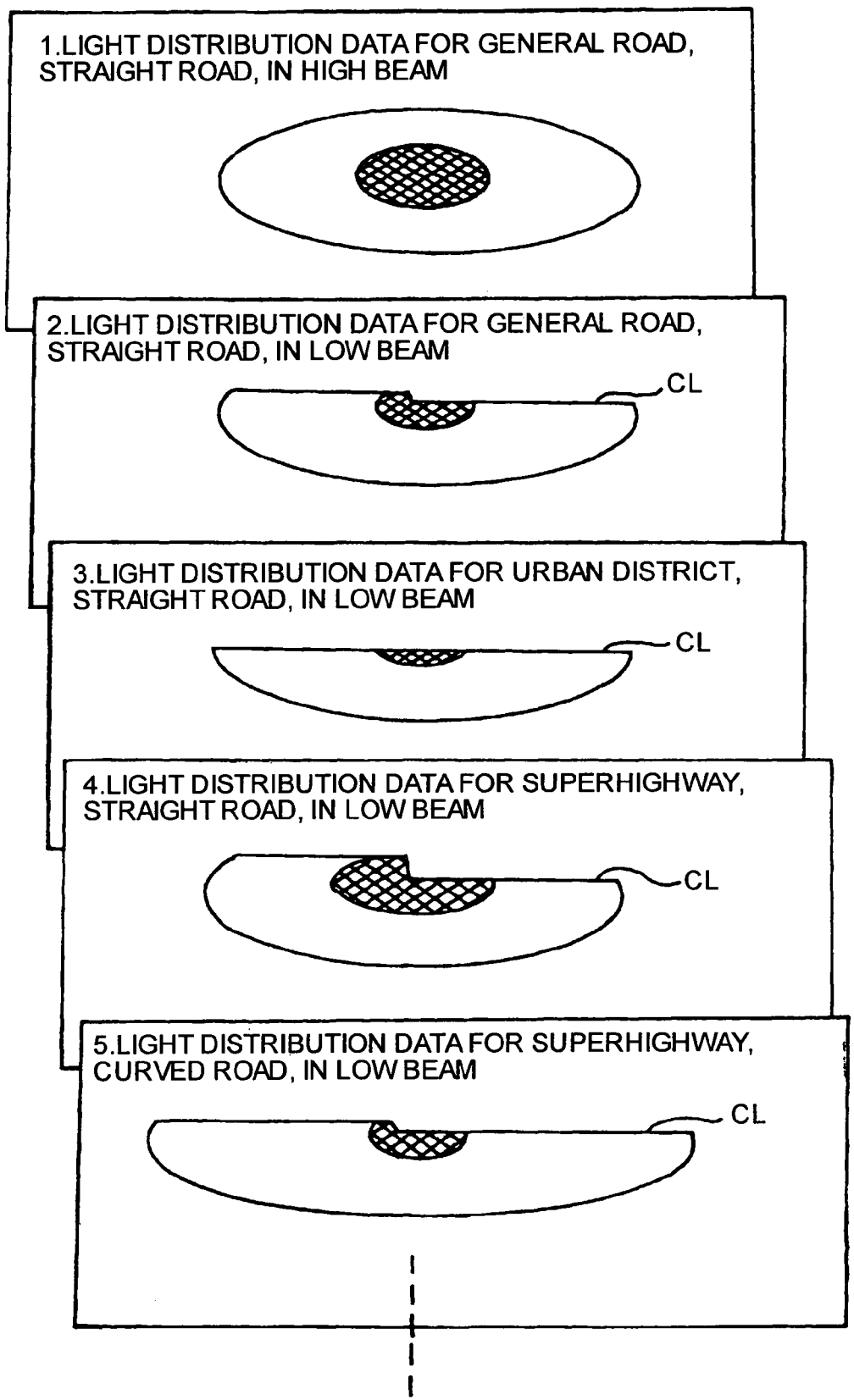
FIG. 12 is a schematic diagram for illustrating light distribution data and corresponding light distribution.
Figure 13:
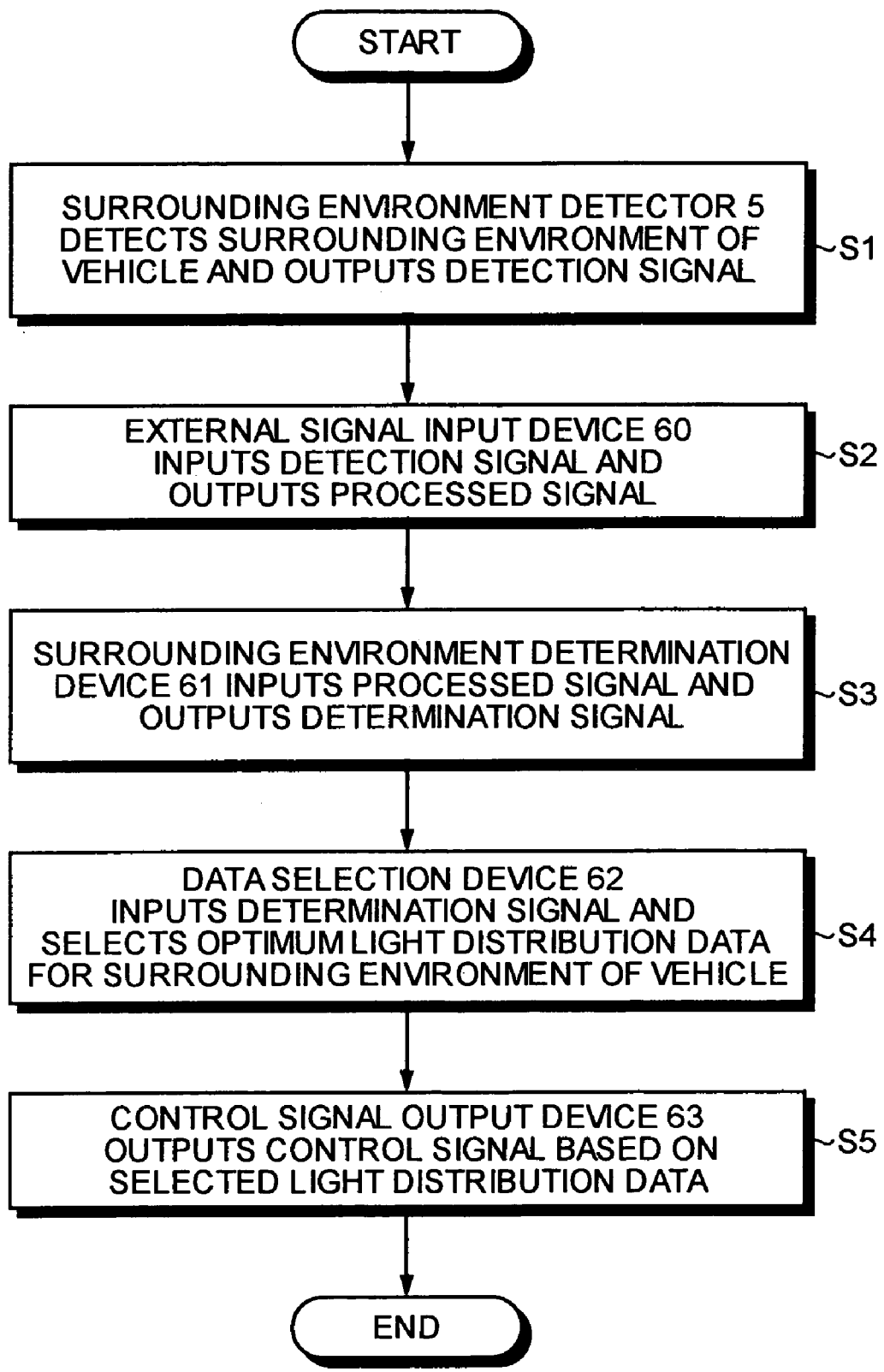
FIG. 13 is a flowchart of operation of the digital display apparatus according to the first embodiment.

The digital data on the light distribution patterns is a digital data on a combination of the various light distribution patterns. For example, the digital data includes "1. light distribution data for general road, straight road in high beam", "2. light distribution data for general road, straight road in low beam", "3. light distribution data for urban district, straight road in low beam", "4. light distribution data for highway, straight road in low beam", and "5. light distribution data for highway, curved road in low beam" as well as "6. light distribution data for highway, straight road in low beam", "7. light distribution data for highway, curved road in high beam", "8. light distribution data for general road, curved road in high beam", "9. light distribution data for general road, curved road in low beams", "10. light distribution data for general road and crossing", "11. light distribution data for urban district, straight road in high beam", "12. light distribution data for urban district, curved road in low beam", "13. light distribution data for urban district, curved road in high beam", and "14. light distribution data for urban district and crossing" which are not shown in FIG. 12. The luminous intensity (illuminance) of a checkered central portion of each light distribution pattern in FIG. 12 is higher than that of a white surrounding portion, The digital data on the light distribution patterns is data created by computer simulation so as to satisfy each standard in a light distribution design of the vehicle lighting apparatus. The digital data includes a plurality of binary-number bits for obtaining a plurality of luminous intensity gradations of many pixels, respectively. As a result, each light distribution pattern obtained based on the light distribution data shown in FIG. 12 and FIG. 13 can satisfy each standard.

Namely, it is necessary and important for the vehicle lighting apparatus (e.g., a headlamp, a fog lamp, a bent lamp (bending lamp), a curve lamp, or a side lamp) to illuminate the road surface and the like in a predetermined light distribution pattern that is set according to rules and regulations for traffic safety purposes. Therefore, the light distribution of the vehicle lighting apparatus is designed by the computer simulation so as to be able to ensure obtaining a predetermined light distribution pattern for each lamp or each function.

The light distribution design is made based on an ideal light distribution pattern that satisfies a predetermined light distribution pattern. This ideal light distribution pattern is a light distribution pattern obtained by digitally creating a light distribution pattern irradiated on a screen 10 meters head of the vehicle lighting apparatus so as to coincide with the light distribution pattern in which the lighting apparatus actually illuminates the road surface and the like. The ideal light distribution pattern thus digitally created by the computer represents a luminance intensity change in the form of a color distribution as an image visible to a person's eye, e.g., in 256-gradation scale for eight bits.

A magnitude of the screen is set so that left and right sides are respectively at 51.2 degrees against the vertical line VU-VD and upper and lower sides are respectively at 38.4 degrees against the horizontal line HL-HR. If 0.1 degree×0.1 degree of the screen is one pixel, the screen has 1,024×768=786,432 pixels. As a result, the digital data on the light distribution pattern in this embodiment is digital data of eight bits having 786,432 pixels in a 256-gradation scale created based on ideal light distribution pattern. Namely, the digital data on the light distribution pattern is very digital data on the ideal light distribution pattern.

On the other hand, the number of the micro mirror elements 25 of the reflection type digital light deflector 2 is set at 1,024×768=786,432. By so setting, one pixel of the digital data on the light distribution pattern corresponds to one of the micro mirror elements 25 of the reflection type digital light deflector 2. The reflection type digital light deflector 2 can finely control each of the 786,432 micro mirror elements 25 to emit a full-white color, a full-black color, and gray colors at intermediate multiple gradations (e.g., 254 gradations if the data includes eight bits). As a result, It is possible to finely, digitally control each of the 786,432 micro mirror elements 25 of the reflection type digital light deflector 2 to emit colors at 256 gradations based on the digital data on the light distribution pattern, i.e., the 256-gradation digital data on the 786,432 pixels of the ideal light distribution pattern.

As can be seen, the digital display apparatus according to the first embodiment digitally forms the ideal light distribution pattern and Irradiates light in the pattern, Therefore, the apparatus can illuminate the road surface and the like in the ideal light distribution pattern. That is, the digital display apparatus and the digital lighting apparatus according to the present invention digitally form the ideal light distribution pattern using the digital data on the ideal light distribution pattern, irradiate the light in the pattern as it is, and illuminate the road surface and the like.

The surrounding environment detector 5 detects an environment surrounding the vehicle and outputs a detection signal. The surrounding environment detector 5 includes at least one of, for example, a steering sensor that detects one of or both of a steering angle and a steering speed of a steering wheel and that outputs a steering signal, a raindrop sensor that detects that it rains and that outputs a rain signal, a luminous intensity sensor that detects a brightness of surroundings of the vehicle and that outputs a luminous intensity signal, a turn sensor that detects an ON signal of a turn signal switch and that outputs a turn signal, a vehicle speed sensor that detects a vehicle speed and that outputs a vehicle speed signal, a wiper sensor that detects an ON signal of a wiper switch and that outputs a wiper signal, a radar that detects a reflected wave from a target in the surroundings of the vehicle and that outputs a radar signal, a humidity sensor that detects humidity of the surroundings of the vehicle and that outputs a humidity signal, a temperature sensor that detects temperature of the surroundings of the vehicle and that outputs a temperature signal, a light sensor that detects an ON signal of a light switch and that outputs a light signal, an orientation sensor that detects an orientation of the vehicle and that outputs an orientation signal, and an electronic toll collection (ETC) that outputs a communication signal when the vehicle enters a highway. Thus, the surrounding environment detector 5 includes either one sensor or a combination of a plurality of sensors.

The information acquisition unit 9 acquires information on the surroundings of the vehicle C and outputs an information signal. The information acquisition unit 9 includes at least one of, for example, a global positioning system (GPS) receiver (e.g., car navigation system) that receives a position information signal output from a GPS or a ground-based station (e.g., an electronic reference point), and an imaging device that images the information on the surroundings of the vehicle C and that outputs a signal (an image signal) based on an image. The information acquisition unit 9 can serve as th surrounding environment detector 5.

The steering sensor has a plurality of slits provided equidistantly on a rotational body rotating while being interlocked with the steering of the steering wheel and a sensor such as a photo-interrupt sensor put between the slits on the rotational body. The steering sensor converts the steering angle to an electric signal based on the output of the sensor, detects a rotational direction and a position of the steering wheel, and outputs a detection signal as the steering signal to the controller 6. The raindrop sensor outputs an Hi-level signal or an LO-level signal as the rain signal to the controller 6 when it rains or it does not rain, respectively. The luminous intensity sensor outputs an HI-level signal or an LO-level signal as the luminous intensity signal to the controller 6 when the brightness of the surroundings of the vehicle is equal to or higher than a predetermined brightness or equal to or lower than the predetermined brightness, respectively. The turn sensor outputs an Hi-level signal or an LO-level signal as the turn signal to the controller 6 when the turn signal switch is turned on or off, respectively. The vehicle speed sensor outputs the vehicle speed signal with a pulse changing according to the vehicle speed, to the controller 6. The wiper sensor outputs an Hi-level signal or an LO-level signal as the wiper signal to the controller 6 when the wiper switch is turned on or off, respectively. The imaging device, which has an image processing circuit (not shown), images the information on the surroundings of the vehicle and outputs the image signal to the image processing circuit. The image processing circuit processes the image signal and outputs an Hi-level signal or an LO-level signal to tho controller 6 based on whether an oncoming vehicle or a preceding vehicle is present, whether it is foggy, whether there is a crossing, and whether a road is a highway or a general road.

The controller 6 includes an external signal input unit 60, a surrounding environment determination unit 61, a data selection unit 62, and a control signal output unit 63. The external signal input unit 60 inputs an external signal such as the detection signal of the surrounding environment detector 5 or the information signal of the information acquisition unit 9 and outputs the external signal as a processing signal to the surrounding environment determination unit 61. The surrounding environment determination unit 61 determines the surrounding environment of the vehicle based on the processing signal input from the external signal input unit 60 and outputs a determination signal to the data selection unit 62. The data selection unit 62 selects digital data on the optimum light distribution pattern for the surrounding environment of the vehicle from among digital data on a plurality of light distribution patterns stored in the storage unit 4 based on the determination signal input from the surrounding environment determination unit 61, and outputs the selected digital data to the control signal output unit 63. The control signal output unit 63 outputs a control signal for individually, digitally controlling switch over of the tilt angles of the micro mirror elements 25 to the reflection type digital light deflector 2 based on the digital data on the optimum light distribution pattern for the surrounding environment of the vehicle input from the data selection unit 62.

The controller 6 employs a computer loaded on the vehicle. As the computer, a computer that controls a car navigation system, a car audio system, a cellular phone, a control circuit section, an electrical control unit (ECU) and electronic control unit and the like are included. The controller 6 may employ a computer that is not loaded on the vehicle, e.g., a portable personal computer. With the portable personal computer, by storing user's desired digital data In the portable personal computer, even if the vehicle changes to the other vehicle, the user's desired light distribution pattern can be acquired at any time when the portable personal computer is connected to the changed vehicle. The controller 6 is controlled by an ordinary operating system (OS). Thus, the controller 6 is constituted separately from the reflection type digital light deflector 2.

The controller/computer 6 includes a central processing unit (CPU) 66. The CPU 66 includes the surrounding environment determination unit 61 and the data selection unit 62. The CPU 66 includes a main storage unit that stores a control program and a buffer storage unit which are not shown in FIG. 1.

The external signal input unit 60 included in the controller 6 is, for example, an interface circuit. The control signal output unit 63 included in the controller 6 is, for example, a driver circuit.

The surrounding environment determination unit 61 includes at least one of an oncoming vehicle/preceding vehicle determination unit, a highway/general road determination unit, an urban district determination unit (urban district/suburb determination unit), a crossing determination unit, a straight/curved road determination unit, a rain determination unit, a fog determination unit, a snow determination unit, an orientation determination unit, and a wait-at-stoplight determination unit.

The oncoming vehicle/preceding vehicle determination unit determines whether an oncoming vehicle or a preceding vehicle is present based on the image signal obtained by imaging information on surroundings of the vehicle by the imaging device of the surrounding environment detector 5 and output from the imaging device, and outputs an oncoming vehicle/preceding vehicle presence signal or an oncoming vehicle/preceding vehicle absence signal.

The highway/general road determination unit determines whether the road is a highway or a general road based on at least one of the image signal obtained by imaging the information on surroundings of the vehicle (e.g., a white line or a median strip drawn on the road surface) by the Imaging device of the surrounding environment detector 5 and output from the imaging device, the vehicle speed single obtained by detecting the vehicle speed by the vehicle speed sensor of the surrounding environment detector 5 and output from the vehicle sensor, the position information signal output from the GPS or the ground-based station (e.g., electronic reference point) of the surrounding environment detector 5 and received by a GPS receiver (e.g., car navigation system), and the communication signal output from the ETC of the surrounding environment detector 5, and outputs a highway signal or a general road signal.

The urban district determination unit determines whether the vehicle is in the urban district based on at least one of the image signal obtained by imaging the information on surroundings of the vehicle by the imaging device of the surrounding environment detector 5 and output from the imaging device, the luminous intensity signal obtained by detecting the brightness of the surroundings of the vehicle by the luminous intensity sensor of the surrounding environment detector 5 and output from the luminous intensity sensor, and the position information signal output from the GPS or the like of the surrounding environment detector 5, and outputs a signal indicating that the vehicle is in the urban district or a signal indicating that the vehicle is not in the urban district (e.g., a signal indicating that the vehicle is in the suburbs).

The crossing determination unit determines whether the vehicle is at a crossing based on at least one of the image signal obtained by imaging the information on surroundings of the vehicle (e.g., a white line or a median strip drawn on the road surface) by the imaging device of the surrounding environment detector 5 and output from the imaging device, the turn signal obtained by detecting the ON signal of the turn signal switch by the turn sensor of the surrounding environment detector 5 and output from the turn sensor, and the position information signal output from the GPS or the like of the surrounding environment detector 5, and outputs a signal Indicating that the vehicle is at a crossing or a signal indicating that the vehicle is not at a crossing.

The straight/curved road determination unit determines whether the road is straight or curved based on at least one of the steering signal obtained by detecting one of or both of the steering angle and the steering speed of the steering wheel by the steering sensor of the surrounding environment detector 5 and output from the steering sensor, the vehicle speed obtained by detecting the vehicle speed by the vehicle speed sensor of the surrounding environment detector 5 and output from the vehicle speed sensor, the position information signal output from the GPS or the like of the surrounding environment detector 5, and the image signal obtained by imaging the information on surroundings of the vehicle (e.g., a curved white line drawn on the road surface) by the imaging device of the surrounding environment detector 5 and output from the imaging device, and outputs a straight signal or a curve signal.

The rain determination unit determines whether it rains based on at least one of the rain signal obtained by detecting that it rains by the raindrop sensor of the surrounding environment detector 5 and output from the raindrop sensor, the wiper signal obtained by detecting the ON signal of the wiper switch by the wiper sensor of the surrounding environment detector 5 and output from the wiper sensor, and the image signal obtained by imaging the information on surroundings of the vehicle (e.g., a reflectance of the road surface depending on how wet the surface is) by the imaging device of the surrounding environment detector 5 and output from the imaging device, and outputs a signal indicating that it rains or a signal indicating that it does not rain.

The fog determination unit determines whether it is foggy based on at least one of the image signal obtained by imaging the information on surroundings of the vehicle by the imaging device of the surrounding environment detector 5 and output from the imaging device, the radar signal obtained by detecting the reflected wave from the target in the surroundings of the vehicle by the radar of the surrounding environment detector 5 and output from the radar, the humidity signal obtained by detecting the humidity of the surroundings of the vehicle by the humidity sensor of the surrounding environment detector 5 and output from the humidity sensor, and the temperature signal obtained by detecting the temperature of the surroundings of the vehicle by the temperature sensor of the surrounding environment detector 5 and output from the temperature sensor, and outputs a signal indicating that it is foggy or a signal indicating that it is not foggy.

The snow determination unit determines whether it snows based on at least one of the image signal obtained by imaging the information on surroundings of the vehicle by the imaging device of the surrounding environment detector 5 and output from the imaging device, the wiper signal obtained by detecting the ON signal of the wiper switch by the wiper sensor of the surrounding environment detector 5 and output from the wiper sensor, and the temperature signal obtained by detecting the temperature of the surroundings of the vehicle by the temperature sensor of the surrounding environment detector 5 and output from the temperature sensor, and outputs a signal indicating that it snows or a signal indicating that it does not snow.

The orientation determination unit determines whether the orientation of the vehicle changes based on the orientation signal obtained by detecting the orientation of the vehicle by the orientation sensor of the surrounding environment detector 5 and output from the orientation sensor, and outputs an orientation change signal according to a variation of the orientation of the vehicle.

The wait-at-stoplight determination unit determines whether the vehicle is waiting at a stoplight based on the vehicle speed signal obtained by detecting the vehicle speed by the vehicle speed sensor of the surrounding environment detector 5 and output from the vehicle speed sensor, the position information signal output from the GPS or the like of the surrounding environment detector 5, and the image signal obtained by imaging the information on surroundings of the vehicle by the imaging device of the surrounding environment detector 5 and output from the imaging device, and outputs a signal indicating that the vehicle is waiting at a stoplight or a signal indicating that the vehicle is not waiting at a stoplight.

The surrounding environment determination unit 61 includes one determination unit or a plurality of determination units. The white line or the like drawn on the road surface and imaged by the imaging device of the surrounding environment detector 5 as the information on surroundings of the vehicle is prescribed by the Road Traffic Law. Therefore, this information can be used as high-quality information.

The data selection unit 62 includes a main data selection section and an interrupt data selection section. The main data selection section selects the digital data on the optimum light distribution pattern for the surrounding environment of the vehicle from among pieces of the digital data on the light distribution patterns stored in the storage unit 4 based on the determination signal from at least one of the oncoming vehicle/preceding vehicle determination unit, the highway/general road determination unit, the urban district determination unit, the crossing determination unit, the straight/curved road determination unit, the rain determination unit, the fog determination unit, and the snow determination unit. The interrupt data selection section halts and interrupts the selection of the main data selection section and selects the digital data on the optimum light distribution pattern for the vehicle waiting at a stoplight or the orientation of the vehicle from among pieces of digital data on the light distribution patterns stored in the storage unit 4.

The information display unit 90 is mounted in the CPU 66 of the controller/computer 6 and connected to the external signal input unit 60 and the control signal output unit 63.

The information display unit 90 controls the reflection type digital light deflector 2 and displays information P2 that uses a contrast between the ON reflected light L4 and the OFF reflected light L5 from the reflection type digital light deflector 2 in a predetermined light distribution pattern (the optimum light distribution pattern P5 for the surrounding environment of the vehicle) for illuminating the road surface and the like through th light irradiation unit 3 based on the information signal from the information acquisition unit 9.

Figure 14:
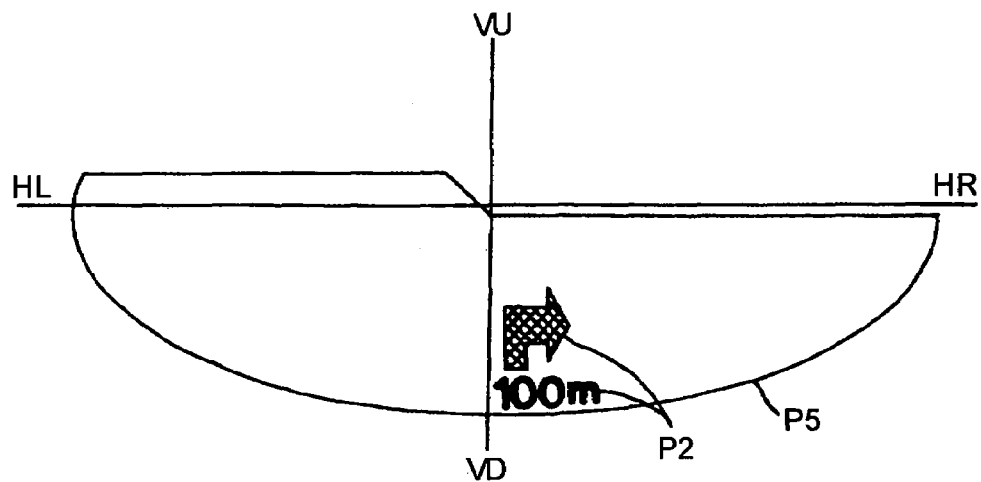
FIG. 14 is a schematic diagram for illustrating a state in which contrast information is displayed in a predetermined light distribution pattern.
Figure 15:
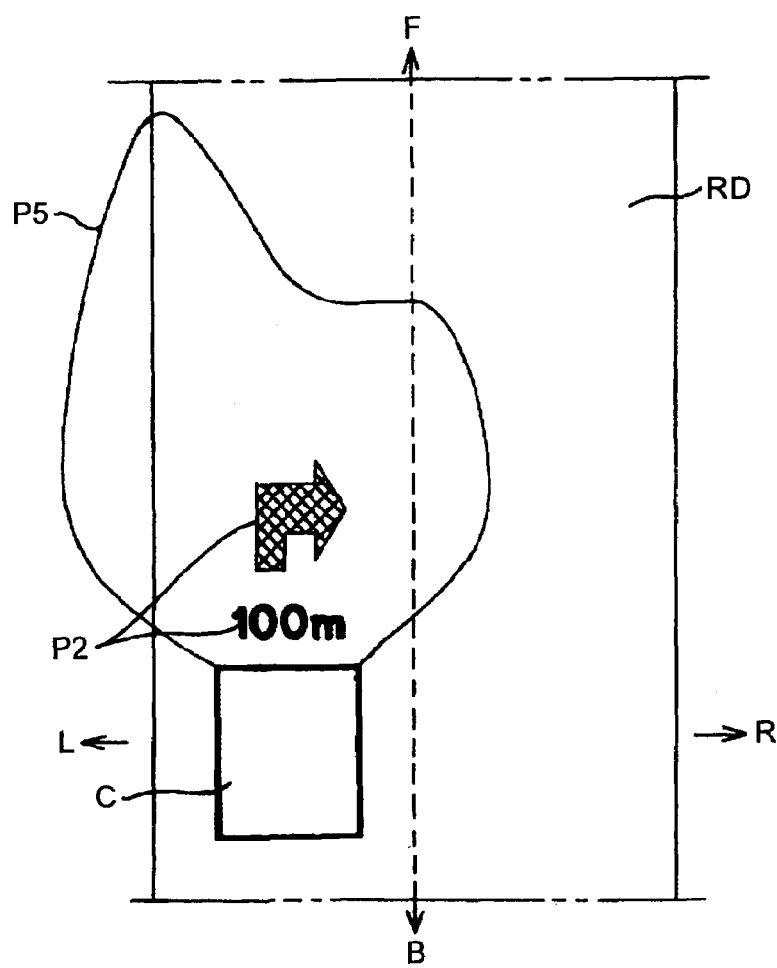

The contrast information P2 includes, for example, a graphic, a symbol, a letter, a number, and the like. As shown in FIGS. 14 and 15, the contrast information P2 in this embodiment includes "an arrow curved to the right" and "a letter of '100 m'" based on the position information signal output from the GPS or the like of the information acquisition unit 9. The contrast information P2 is displayed in the light distribution pattern for the vehicle passing-by the other vehicle (the optimum light distribution pattern P5 for the surrounding environment of the vehicle) for illuminating the road surface and the like RD.

The contrast information P2 is displayed within the following range.

Figure 16:
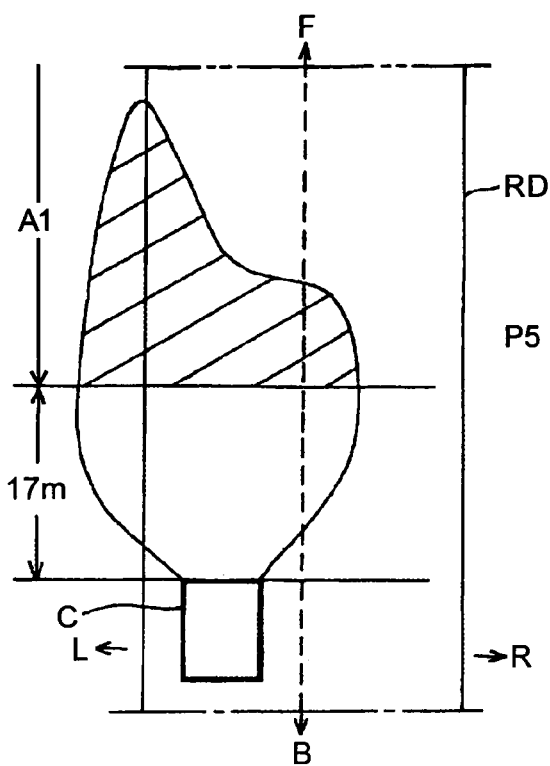
FIG. 16 is a schematic diagram for illustrating information display requirements for satisfying a driving task.
Figure 17:
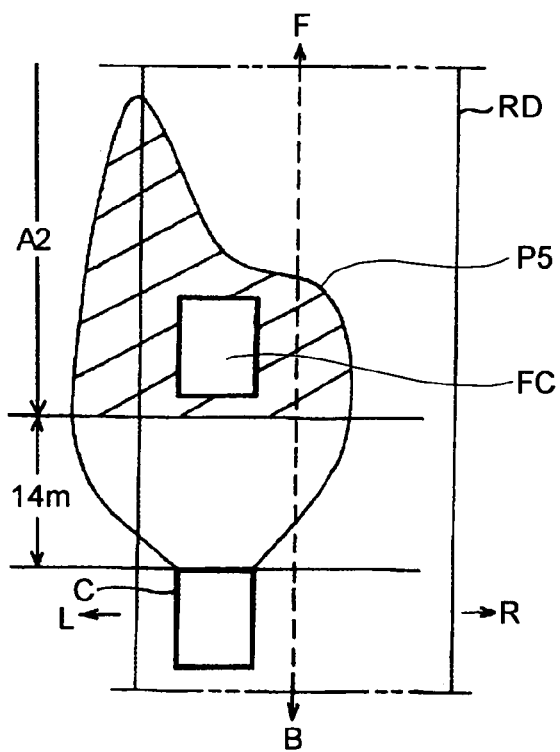
FIG. 17 is a schematic diagram for illustrating information display requirements for satisfying a condition that the information display is not obstructed by a preceding vehicle.

As shown in FIG. 16, the contrast information P2 is displayed within about 17 meters ahead in the traveling direction of the vehicle C. Namely, in order to satisfy the driving task of the driver, preview for three seconds or more is required. If the vehicle C is running at 20 km/h or more (since the vehicle running at less than 20 km/h is considered a slow-moving vehicle, a necessary condition for the preview for three seconds or more is excluded), it is necessary for the lighting apparatus of the vehicle to illuminate at least about 17 meters ahead in the traveling direction of the vehicle C. A range A1 more than about 17 meters ahead in the traveling direction is a range for acquiring information on the field of view necessary for the driving task, e.g., the shape of the road and whether an obstacle is present. Therefore, if the contrast information P2 is displayed within the range A1 more than 17 meters ahead in the traveling direction, the display obstructs the driving task. Thus, it is preferable for traffic safety to display the contrast information P2 within about 17 meters ahead in the traveling direction of the vehicle C so as to meet the driving task of the driver.

The contrast information P2 is displayed within about 14 meters ahead in the traveling direction of the vehicle C. Namely, if a preceding vehicle FC is present, the driver of the vehicle C generally tends to maintain distance to the preceding vehicle FC corresponding to about 2.5 seconds. The distance that corresponds to about 2.5 seconds corresponds to about 14 meters if the vehicle C is running at 20 km/h. If the contrast information P2 is displayed within a range A2 more than about 14 meters ahead in the traveling direction, the display of the contrast information P2 is obstructed by a tall end of the preceding vehicle FC. It is, therefore, preferable for traffic safety to display the contrast information P2 within about 14 meters ahead in the traveling direction of the vehicle C so as not to be obstructed by the tail end of the preceding vehicle FC.

Figure 18:
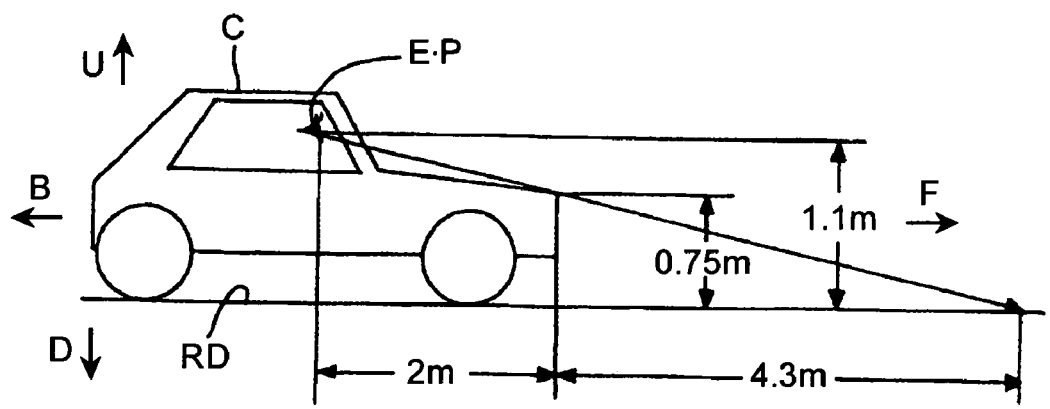
FIG. 18 is a schematic diagram for illustrating information display requirements for satisfying a condition that the information display is not obstructed by a hood of a vehicle.
Figure 19:
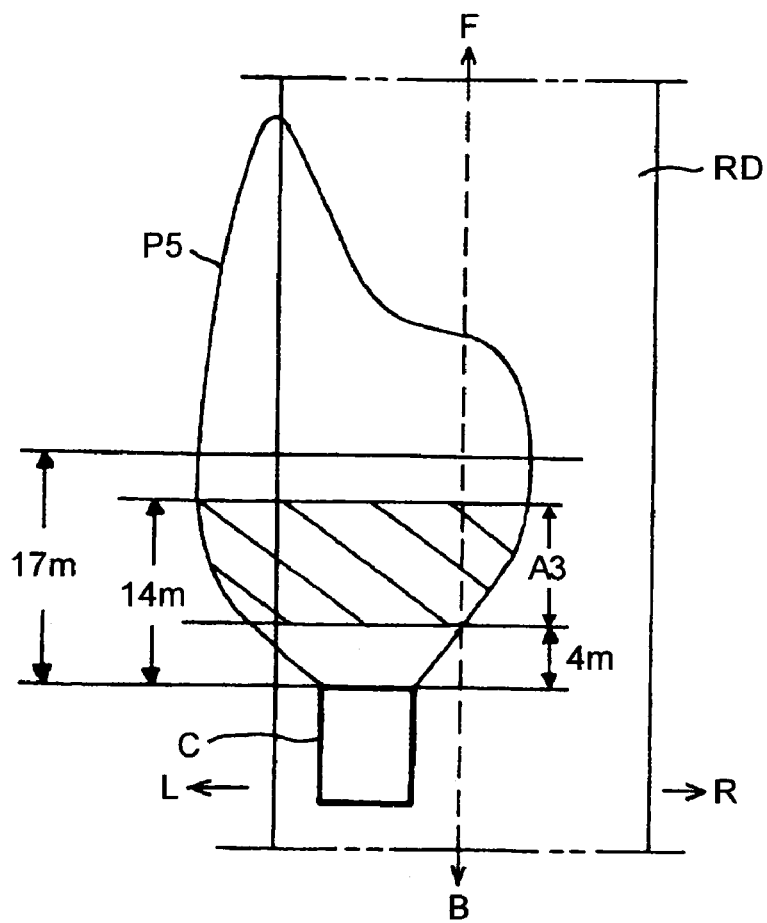
FIG. 19 is a schematic diagram for illustrating a state in which the information display requirements for satisfying the driving task, the condition that the information display is not obstructed by a preceding vehicle, and the condition that the information display is not obstructed by the hood of the vehicle are put together.

As shown in FIGS. 18 and 19, the contrast information P2 is displayed more than about 4 meters ahead in the traveling direction of the vehicle C. Namely, a body shape of the vehicle C causes a blind spot for the visibility of the driver toward the forward road surface. If the vehicle C is a normal sedan, the field of view from a driver's seat has a blind spot caused by the influence of the hood of the vehicle C. For example, if a height of the hood is 0.75 meters above the ground, a length of the hood from a driver's eye E P is 2 meters, and a height of the driver's eye E P is 1.1 meter above the ground, the range within about 4.3 meters or less ahead in the traveling direction of the vehicle C enters the blind spot of the field of view by the influence of the hood. For this reason, if the contrast information P2 is displayed within about 4 meters ahead in the traveling direction, the contrast information P2 enters the blind point caused by the hood. It is, therefore, preferable for traffic safety to display the contrast information P2 more than 4 meters ahead in the traveling direction of the vehicle C so as not to enter the blind spot caused by the hood.

Thus, it is preferable for traffic safety to display the contrast information P2 within a range A3 that is about 4 to 14 meters ahead in the traveling direction of the vehicle C.

Basically, the digital display apparatus according to the first embodiment is constituted so that the vehicle digital lighting assemblies (each of which includes the optical engine 1, the reflection type digital light deflector 2, and the light irradiation unit 3 or includes the reflection optical deflector 2 and the light irradiation unit 3) are respectively loaded on the left and the right in the front portion of the vehicle C at predetermined intervals. Therefore, if the contrast information P2 is displayed from each of the left and right vehicle digital lighting assemblies, it is necessary to strictly calculate an irradiation position, an irradiation direction, a spacing between the left and right digital lighting apparatuses, and an attachment height of each of the left and right digital lighting apparatuses so that shapes of the contrast information P2 displayed from the left and right vehicle digital lighting assemblies do not deviate from each other. Nevertheless, because of attachment allowances of the left and right vehicle digital lighting assemblies or the like, the shapes of the contrast information P2 displayed from the left and right vehicle digital lighting assemblies often deviate from each other. The digital display apparatus in this embodiment, therefore, displays the contrast information P2 by the following method.

First, the reflection type digital light deflector 2 included in one of the left and right vehicle digital lighting assemblies irradiates and displays the information P2 formed by the OFF reflected light in the predetermined light distribution pattern P5 (e.g., the light distribution pattern P5 for the vehicle passing-by the other vehicle) for illuminating the road surface and the like RD through the light irradiation unit 3 under the following control of an information display unit 90.

The other reflection type digital light deflector 2 included in one of the left and right vehicle digital lighting assemblies irradiates and displays a non-lighting portion PD formed by the OFF reflected light in the predetermined light distribution pattern P5 for illuminating the road surface and the like RD so as to surround the information P2 through the light irradiation unit 3 under the following control of the information display unit 90.

Figure 22:
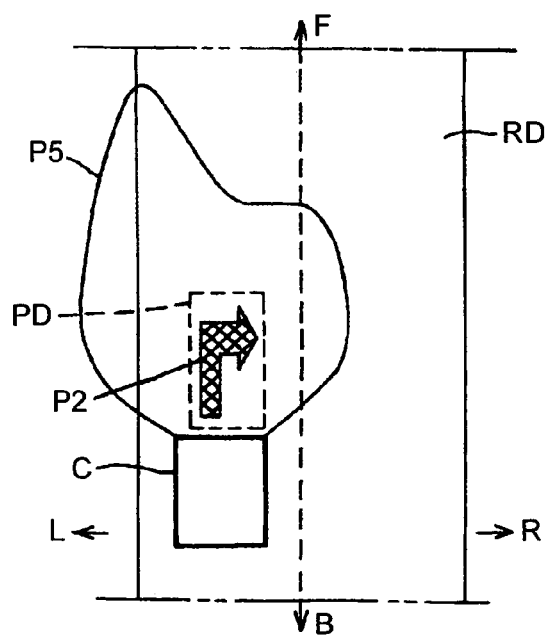

As shown in FIG. 22, the information P2 from one of the left and right vehicle digital lighting assemblies and the non-lighting portion PD from the other one of the left and right vehicle digital lighting assemblies are combined with each other, whereby the information P2 from one vehicle digital lighting assembly is located within a range of the non-lighting portion PD from the other assembly. By doing so, the shapes of the contrast information P2 do not deviate from each other, as compared with an instance in which the information is displayed from the left and right vehicle digital lighting assemblies, respectively. Namely, the contrast information P2 is displayed in a clear contrast.

Assuming that the algorithms for the control of the information display unit 90 are sub-algorithms, the sub-algorithms are added to a main algorithm (see FIG. 13) for the control by the controller 6.

If the information signal from the information acquisition unit 9 is input to the information display unit 90 through the external signal input unit 60, this information display unit 90 calculates a polygon that is the shape of the contrast information P2 and a rectangle of the non-lighting portion PD from the information signal based on the following sub-algorithm, and controls the OFF reflected lights of the left and right reflection type digital light deflectors 2.

Figure 23:
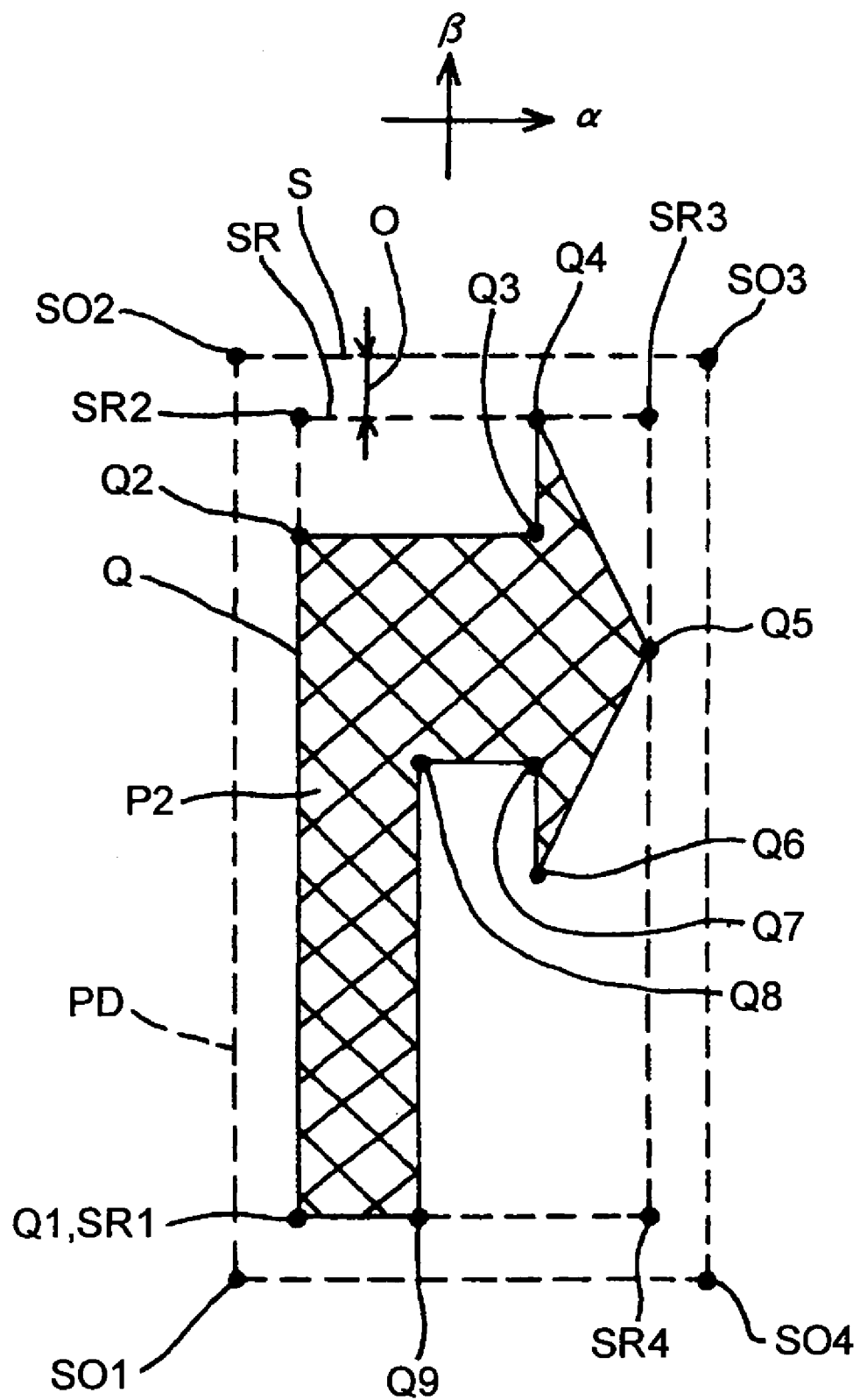
FIG. 23 is a schematic diagram for illustrating a method of forming a polygon of the contrast information.

The information display unit 90 calculates the polygon Q that is the shape of the contrast information P2 from the information signal based on a sub-algorithm (1) of "$Qi=(\alpha i, \beta i)$ (i=1 to 9)" as shown in FIG. 23.

The information display unit 90 calculates a first rectangle SR that surrounds the polygon Q based on a sub-algorithm (2) of "$SRj=(\alpha j, \beta j)$ (j=1 to 4)" as shown in FIG. 23.

The information display unit 90 calculates a second rectangle S that surrounds the first rectangle SR, i.e., offset outward of the first rectangle SR based on a sub-algorithm (3) of "$SOj=(\alpha j+O$ (offset quantity), $\beta j+O$ (offset quantity)) (j=1 to 4)" as shown in FIG. 23.

The information display unit 90 outputs the polygon Q (Qi, where i=1 to 9) obtained as a result of the calculation based on the sub-algorithm (1) to one reflection type digital light deflector 2 through the control signal output unit 63 based on a sub-algorithm (4). In addition, the information display unit 90 outputs the second rectangle S (SOj, where j=1 to 4) obtained as a result of the calculation based on the sub-algorithm (3) to the one reflection type digital light deflector 2 through the control signal output unit 63.

The surrounding environment detector 5 detects the surrounding environment of the vehicle (e.g., a region condition for the region in which the vehicle is running, a road condition for the road on which the vehicle is running or a weather condition) and outputs a detection signal to the controller 6 (at S1). If the detection signal is input to the controller 6, then the interface circuit of the external signal input unit 60 inputs the external signal such as the detection signal from the surrounding environment detector 5, processes the input signal to a signal that can be handled by the controller 6, and outputs the processed signal to the surrounding environment determination unit 61 (at S2). If the processed signal is input to the surrounding environment determination unit 61, the surrounding environment determination unit 61 determines the surrounding environment of the vehicle based on the processed signal from the external signal input unit 60, and outputs a determination signal to the data selection unit 62 (at S3).

The surrounding environment determination unit 61 executes the first determination step to the tenth determination step. At the first determination step, the oncoming vehicle/preceding vehicle determination unit determines whether an oncoming vehicle or a preceding vehicle is present based on the image signal of the imaging device and outputs the oncoming vehicle/preceding vehicle presence signal or the oncoming vehicle/preceding vehicle absence signal. At the second determination step, the highway/general road determination unit determines whether the road is a highway or a general road based on at least one of the image signal of the imaging device, the vehicle speed single of the vehicle speed sensor, the position information signal of the GPS, and the communication signal of the ETC, and outputs the highway signal or the general road signal. At the third determination step, the urban district determination unit determines whether the vehicle is in the urban district based on at least one of the image signal of the imaging device, the luminous intensity signal of the luminous intensity sensor, and the position information signal of the GPS, and outputs the signal indicating that the vehicle is in the urban district or the signal indicating that the vehicle is not in the urban district. At the fourth determination step, the crossing determination unit determines whether the vehicle is at a crossing based on at least one of the image signal of the imaging device, the turn signal of the turn sensor, and the position information signal of the GPS or th like, and outputs the signal indicating that the vehicle is at a crossing or the signal indicating that the vehicle is not at a crossing. At the fifth determination step, the straight/curved road determination unit determines whether the road is straight or curved based on at least one of the steering signal of the steering sensor, the vehicle speed signal of the vehicle speed sensor, and the position information signal of the GPS, and the image signal of the imaging device, and outputs the straight signal or the curve signal. At the sixth determination step, the rain determination unit determines whether it rains based on at least one of the rain signal of the raindrop sensor, the wiper signal of the wiper sensor, and the image signal of the imaging device, and outputs the signal indicating that it rains or the signal indicating that it does not rain. At the seventh determination step, the fog determination unit determines whether it is foggy based on at least one of the image signal of the imaging device, the radar signal of the radar, the humidity signal of the humidity sensor, and the temperature signal of the temperature sensor, and outputs the signal indicating that it is foggy or the signal indicating that it is not foggy. At the eighth determination step, the snow determination unit determines whether it snows based on at least one of the image signal of the imaging device, the wiper signal of the wiper sensor, and the temperature signal of the temperature sensor, and outputs the signal indicating that it snows or the signal indicating that it does not snow. At the ninth determination step, the orientation determination unit determines whether the orientation of the vehicle changes based on the orientation signal of the orientation sensor, and outputs the orientation change signal according to the variation of the orientation of the vehicle. At the tenth determination step, the wait-at-stoplight determination unit determines whether the vehicle is waiting at a stoplight based on all of or one of the vehicle speed signal of the vehicle speed sensor, the position information signal of the GPS, and the image signal of the imaging device, and outputs the signal indicating that the vehicle waiting at a stoplight or the signal indicating that the vehicle is not waiting at a stoplight. The determination steps executed by the surrounding environment determination unit 61 may include at least one of the first to tenth determination steps or include the other determination step.

If the determination signal is input to the data selection unit 62, the data selection unit 62 selects the digital data on the optimum light distribution pattern for the surrounding environment of the vehicle from among pieces of digital data on the light distribution patterns stored in the storage unit 4 based on the determination signal of each determination unit included in the surrounding environment determination unit 5 (at S4). The main data selection section selects the digital data on the optimum light distribution pattern for the surrounding environment of the vehicle from among pieces of digital data on the light distribution patterns stored in the storage unit 4 based on the determination signal from at least one of the oncoming vehicle/preceding vehicle determination unit, the highway/general road determination unit, the urban district determination unit, the crossing determination unit, the straight/curved road determination unit, the rain determination unit, the fog determination unit, and the snow determination unit included in the surrounding environment determination unit 61.

For example, if the highway/general road determination unit determines that the road is a general road, the straight/curved road determination unit determines that the road is straight, and the oncoming vehicle/preceding vehicle determination unit determines that no oncoming vehicle/preceding vehicle is present, the main data selection section selects "1. light distribution data for general road, straight road, and running vehicle" shown in FIG. 12. If the highway/general road determination unit determines that the road is a general road, the straight/curved road determination unit determines that the road is straight, and the oncoming vehicle/preceding vehicle determination unit determines that an oncoming vehicle/preceding vehicle is present, the main data selection section selects "2. light distribution data for general road, straight road, and vehicle passing-by the other vehicle" shown in FIG. 12. If the urban district determination unit determines that the vehicle is in an urban district, the straight/curved road determination unit determines that the road is straight, and the oncoming vehicle/preceding vehicle determination unit determines that an oncoming vehicle/preceding vehicle is present, the main data selection section selects "3. light distribution data for urban district, straight road, and vehicle passing-by the other vehicle" shown in FIG. 12. If the highway/general road determination unit determines that the road is a highway, the straight/curved road determination unit determines that the road is straight, and the oncoming vehicle/preceding vehicle determination unit determines that an oncoming vehicle/preceding vehicle is present, the main data selection section selects "4. light distribution data for highway, straight road, and vehicle passing-by the other vehicle" shown in FIG. 12. If the highway/general road determination unit determines that the road is a highway, the straight/curved road determination unit determines that the road is curved, and the oncoming vehicle/preceding vehicle determination unit determines that an oncoming vehicle/preceding vehicle is present, the main data selection section selects "5. light distribution data for highway, curved road, and vehicle passing-by the other vehicle" shown in FIG. 12. If the highway/general road determination unit determines that the road is a highway, the straight/curved road determination unit determines that the road is straight, and the oncoming vehicle/preceding vehicle determination unit determines that no oncoming vehicle/preceding vehicle is present, the main data selection section selects "6. light distribution data for highway, straight road, and running vehicle". If the highway/general road determination unit determines that the road is a highway, the straight/curved road determination unit determines that the road is curved, and the oncoming vehicle/preceding vehicle determination unit determines that no oncoming vehicle/preceding vehicle is present, the main data selection section selects "7. light distribution data for highway, curved road, and running vehicle". If the highway/general road determination unit determines that the road is a general road, th straight/curved road determination unit determines that the road is curved, and the oncoming vehicle/preceding vehicle determination unit determines that no oncoming vehicle/preceding vehicle is present, the main data selection section selects "8. light distribution data for general road, curved road, and running vehicle". If the highway/general road determination unit determines that the road is a general road; the straight/curved road determination unit determines that the road is curved, and the oncoming vehicle/preceding vehicle determination unit determines that an oncoming vehicle/preceding vehicle is present, the main data selection section selects "9. light distribution data for general road, curved road, and vehicle passing-by the other vehicle". If the highway/general road determination unit determines that the road is a general road and the crossing determination unit determines that a crossing is present, the main data selection section selects "10. light distribution data for general road and crossing". If the urban district determination unit determines that the vehicle is in an urban district, the straight/curved road determination unit determines that the road is straight, and the oncoming vehicle/preceding vehicle determination unit determines that no oncoming vehicle/preceding vehicle is present, the main data selection section selects "11. light distribution data for urban district, straight road, and running vehicle". If the urban district determination unit determines that the vehicle is in an urban district, the straight/curved road determination unit determines that the road is curved, and the oncoming vehicle/preceding vehicle determination unit determines that an oncoming vehicle/preceding vehicle is present, the main data selection section selects "12. light distribution data for urban district, curved road, and vehicle passing-by the other vehicle". If the urban district determination unit determines that the vehicle is in an urban district, the straight/curved road determination unit determines that the road is curved, and the oncoming vehicle/preceding vehicle determination unit determines that no oncoming vehicle/preceding vehicle is present, the main data selection section selects "13. light distribution data for urban district, curved road, and running vehicles". If the urban district determination unit determines that the vehicle is in an urban district and the crossing determination unit determines that a crossing is present, the main data selection section selects "14. light distribution data for urban district and crossing". examples of the light distribution data selected by the main data selection section include various pieces of light distribution data depending on a combination of selection by the main data selection section besides the "1. light distribution data for general road, straight road, and running vehicle" to the "14. light distribution data for urban district and crossings".

If the digital display apparatus illuminates the road surface and the like in the light distribution pattern selected by the main data selection section of the data selection unit 62, the wait-at-stoplight determination unit of the surrounding environment determination unit 61 determines whether the vehicle is waiting at a stoplight or the orientation determination unit thereof determines whether the orientation of the vehicle changes. If so, the interrupt data selection section of the data selection unit 62 halts and interrupts the selection of the main data selection section and selects the digital data on the optimum light distribution pattern for the vehicle waiting at a stoplight or the orientation of the vehicle from among pieces of digital data on the light distribution patterns stored in the storage unit 4 based on the determination signal from the walt-at-stoplight determination unit or from the orientation determination unit in other words, an interrupt routine performed by the interrupt data selection section is established against a main routine performed by the main data selection section. After this interrupt routine is completed, the main data selection section performs the main routine again.

Referring back to FIG. 13, if the data selection unit 62 selects the digital data on the optimum light distribution pattern for the surrounding environment of the vehicle based on the determination of the surrounding environment determination unit 61, the driver circuit that serves as the control signal output unit 63 outputs the control signal for individually, digitally controlling switchover of the tilt angles of the micro mirror elements 25 to the reflection type digital light deflector 2 based on the digital data on the optimum light distribution pattern for the surrounding environment of the vehicle selected by the data selection unit 62 (at S5).

If the controller 6 outputs the control signal to the reflection type digital light deflector 2, the reflection type digital light deflector 2 controls ON and OFF switching of the many micro mirror elements 25 based on the control signal, i.e., the digital data on the optimum light distribution pattern for the surrounding environment of the vehicle. Thus, the digital display apparatus according to the first embodiment can automatically select the optimum light distribution pattern P5 for the surrounding environment of the vehicle and illuminate the road surface and the like in this selected optimum light distribution P5 pattern for the surrounding environment of the vehicle.

If the information signal from the information acquisition unit 9 is input to the information display unit 90 through the external signal input unit 60, this information display unit 90 calculates the polygon Q that is the shape of the contrast information P and the second rectangle S of the non-lighting portion PD from the information signal based on the sub-algorithm, and outputs the calculation result to the left and right reflection type digital light deflectors 2 through the control signal output unit 63.

Figure 20:
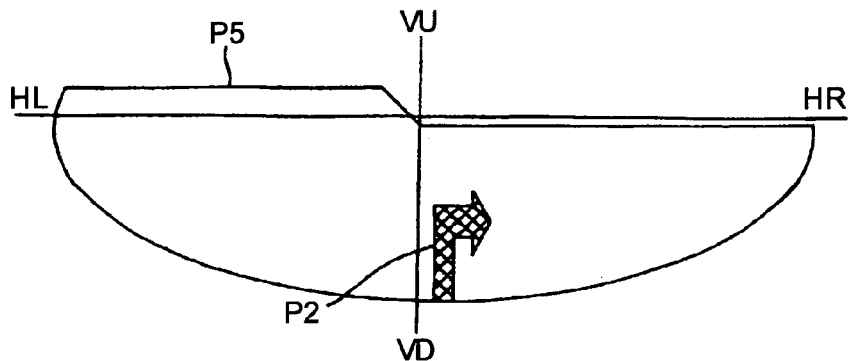
FIG. 20 is a schematic diagram for illustrating a state in which the contrast information is displayed and irradiated in the predetermined light distribution pattern on one side of the reflection type digital light deflector.
Figure 21:
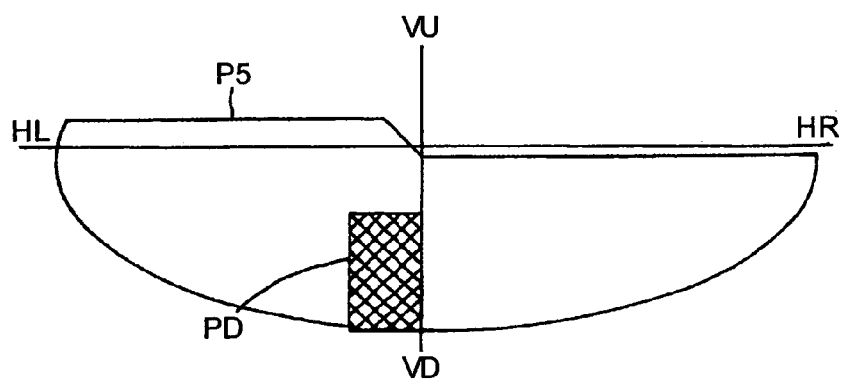
FIG. 21 is a schematic diagram for illustrating a state in which a non-lighting portion is displayed and irradiated in the predetermined light distribution pattern on other side of the reflection type digital light deflector.

As shown in FIG. 20, one of the left and right reflection type digital light deflectors 2 irradiates and displays the information P formed by the OFF reflected light in the predetermined light distribution pattern P5 for illuminating the road surface and the like RD through the light irradiation unit 3 under the control of the information display unit 90. As shown in FIG. 21, the other reflection type digital light deflector 2 irradiates and displays the non-lighting portion PD formed by the OFF reflected light in the predetermined light distribution pattern P5 for illuminating the road surface and the like RD so as to surround the contrast information P through the light irradiation unit 3 under the control of the information display unit 90. As shown in FIG. 22, the contrast information P is displayed in the predetermined light distribution pattern P5 for illuminating the road surface and the like RD while the contrast information P is located within the non-lighting portion PD.

The advantages of the digital display apparatus according to the first embodiment, which is constituted as explained above, will be explained.

The digital display apparatus according to the first embodiment can display the contrast information P in the predetermined light distribution pattern P5 for illuminating the road surface and the like RD by the information display unit 90. Therefore, the driver can drive the vehicle C based on the displayed information. Hence, the digital display apparatus is preferable for traffic safety.

The digital display apparatus according to the first embodiment can automatically display the information on surroundings of the vehicle C in the predetermined light distribution pattern P5 for illuminating the road surface and the like RD as the contrast information P by the information acquisition unit 9. Therefore, the digital display apparatus according to the first embodiment allows the driver to instantly grasp the information on surroundings of the vehicle C from the automatically displayed contrast information P and to drive the vehicle C based on the automatically displayed contrast information P. Hence, the digital display apparatus is preferable for traffic safety.

The digital display apparatus according to the first embodiment can display the contrast information P in the predetermined light distribution pattern P5 for illuminating the road surface and the like RD within the range of about 4 to 14 meters ahead in the traveling direction of the vehicle C. Therefore, it is possible to satisfy the driving task of the driver. In addition, the display of the contrast information P is not obstructed by the tail end of the preceding vehicle FC and the contrast information P does not enter the blind spot of the field of view caused by the hood. Hence, the apparatus is preferable for traffic safety.

According to the digital display apparatus according to the first embodiment, one of the left and right reflection type digital light deflectors 2 irradiates and displays the information P2 formed by the OFF reflected light in the predetermined light distribution pattern P5 for illuminating the road surface and the like RD through the light irradiation unit 3 under the control of the information display unit 90. As shown in FIG. 21, the other reflection type digital light deflector 2 irradiates and displays the non-lighting portion PD formed by the OFF reflected light in the predetermined light distribution pattern P5 for illuminating the road surface and the like RD so as to surround the contrast information P through the light irradiation unit 3 under the control of the information display unit 90. As a result, the digital display apparatus according to the first embodiment displays the contrast information P in the predetermined light distribution pattern P5 for illuminating the road surface and the like RD while the contrast information P is located within the non-lighting portion PD. By doing so, the digital display apparatus according to the first embodiment can display the information using the contrast between the ON reflected light and the OFF reflected light without fading or deviation, as compared with the instance in which the information formed by the OFF reflected light is irradiated and displayed in the predetermined light distribution pattern from the left and right reflection type digital light deflectors through the light irradiation units, respectively. Namely, the digital display apparatus according to the first embodiment can display the polygon Q that is the shape of the contrast information P in a clear contrast and acquire clear information. Hence, the digital display apparatus according to the first embodiment is preferable for traffic safety.

The digital display apparatus according to the first embodiment can automatically select the predetermined light distribution pattern P5 optimum for the surrounding environment of the vehicle and constantly illuminate the road surface and the like in the predetermined light distribution pattern P5 optimum for the surrounding environment of the vehicle. Hence, the digital display apparatus according to the first embodiment is preferable for traffic safety The digital display apparatus according to the first embodiment particularly controls the reflection type digital light deflector 2 based on the digital data on the ideal light distribution pattern. Therefore, it is ensured that the predetermined light distribution pattern that is digitally controlled can be obtained.

The digital display apparatus according to the first embodiment can digitally control the predetermined light distribution pattern P5 optimum for the surrounding environment of the vehicle directly using the digital data on the digitally created light distribution pattern. Therefore, it is ensured that the predetermined light distribution pattern P5 optimum for the surrounding environment of the vehicle without analogous irregularities can be obtained.

The digital display apparatus according to the first embodiment can directly use the digital data on the light distribution pattern obtained in the light distribution design of the vehicle lighting apparatus as the digital date on the light distribution pattern for controlling the reflection type digital light deflector 2. Therefore, it is unnecessary to generate the digital data on the control light distribution pattern and manufacturing cost can be reduced, accordingly.

The digital display apparatus according to the first embodiment can ensure detecting the surrounding environment of the vehicle by the surrounding environment detector 5. Therefore, it is further ensured that the light distribution pattern P5 suited for the surrounding environment of the vehicle can be obtained.

The digital display apparatus according to the first embodiment can ensure controlling the reflection type digital light deflector 2 by the controller 6. Therefore, it is further ensured that the light distribution pattern P5 that is the optimum predetermined light distribution pattern P5 for the surrounding environment of the vehicle and that is free from analogous irregularities can be obtained.

The digital display apparatus according to the first embodiment can ensure determining the surrounding environment of the vehicle by the surrounding environment determination unit 61. Therefore, it is further ensured that the light distribution pattern P5 suited for the surrounding environment of the vehicle can be obtained.

The digital display apparatus according to the first embodiment can select the digital data on the optimum light distribution pattern for the surrounding environment of the vehicle from among the main data in the pieces of digital data on the light distribution patterns by the main data selection section. Therefore, it is further ensured that the light distribution pattern P5 optimum for the surrounding environment of the vehicle can be promptly selected.

According to the digital display apparatus according to the first embodiment, the interrupt data selection section can establish the interrupt control routines against the main control routine performed by the main data selection section. Therefore, the digital display apparatus according to the first embodiment can select the digital data on the optimum light distribution pattern for the surrounding environment of the vehicle more finely and control the data selection accurately and promptly.

Figure 24:
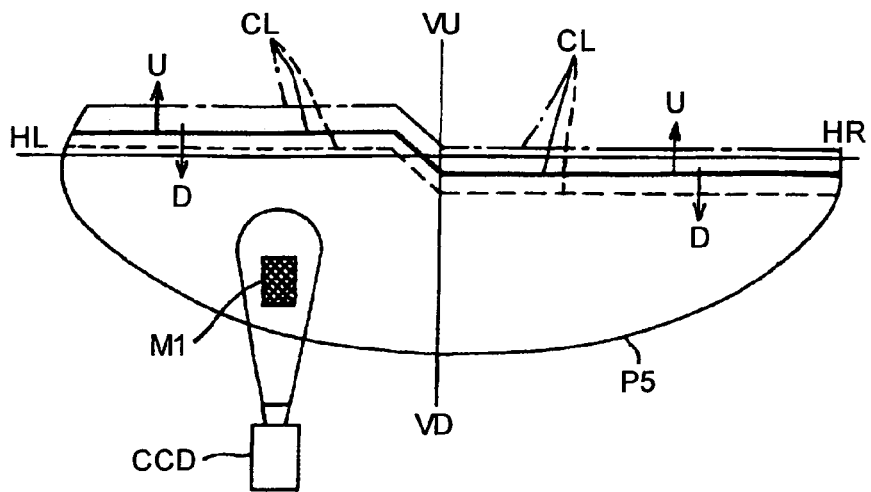
FIG. 24 is a schematic diagram for illustrating a light distribution pattern and an auto-leveling mark of a digital display apparatus according to a first modification of the first embodiment.

FIG. 24 and FIG. 25 are schematic diagrams for illustrating a digital display apparatus according to a first modification of the first embodiment. The same reference symbols as those in FIG. 1 to FIG. 23 denote the same constituent elements The digital display apparatus digital display apparatus according to the first modification of the first embodiment has a self-completive auto-leveling function that includes a charge coupled device (CCD) as an imaging device. Namely, the information display unit 90 displays an auto-leveling mark M1 as the contrast information P in the light distribution pattern P5 for the vehicle passing-by the other vehicle that is the optimum light distribution pattern for the surrounding environment of the vehicle. The CCD imaging device images the auto-leveling mark M1 and outputs an image signal to the controller 6 as the orientation signal. This CCD imaging device includes, for example, a CCD camera for visible light or infrared light. The controller 6 controls the reflection type digital light deflector 2 based on the orientation signal from the CCD imaging device and vertically moves a cut line CL of the light distribution pattern P5 for the vehicle passing-by the other vehicle.

For example, if the vehicle C is running on a down-gradient road surface and the like RD, the auto-leveling mark M1 is shaped to have a tapered upper end. If the vehicle C is running on a horizontal road surface and the like RD, the auto-leveling mark M1 is shaped to be rectangular. If the vehicle C is running on an up-gradient road surface and the like RD, the auto-leveling mark M1 is shaped to have a tapered lower end.

Figure 25A:
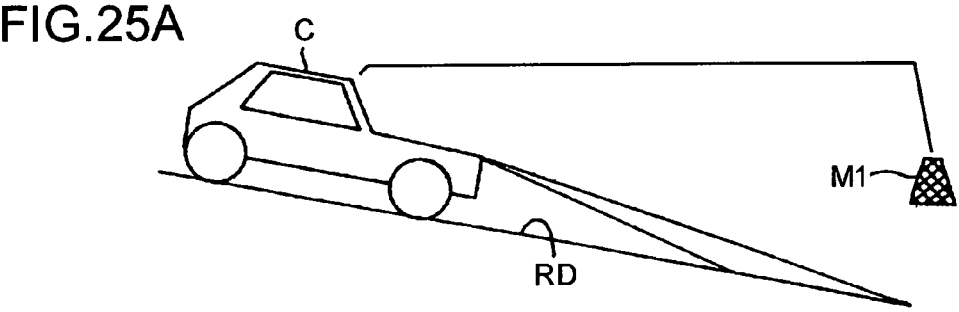
FIG. 25A is a schematic diagram for illustrating a state of the auto-leveling mark when a vehicle is running on a down-hill road.

The CCD imaging device images the auto-leveling mark M1 and outputs the image signal to the controller 6 as the orientation signal. The controller 6 determines that the vehicle C is running on the down-gradient road surface and the like RD and moves the cut line CL of the light distribution pattern P5 for the vehicle passing-by the other vehicle in an arrow-U direction from a thick line or broken line to a one-dot chain line, i.e., upward or maintains the state indicated by the one-dot chain line if the auto-leveling mark M1 based on the orientation signal from the CCD imaging device is shaped to have the tapered upper end as shown in FIG. 25A.

Figure 25B:
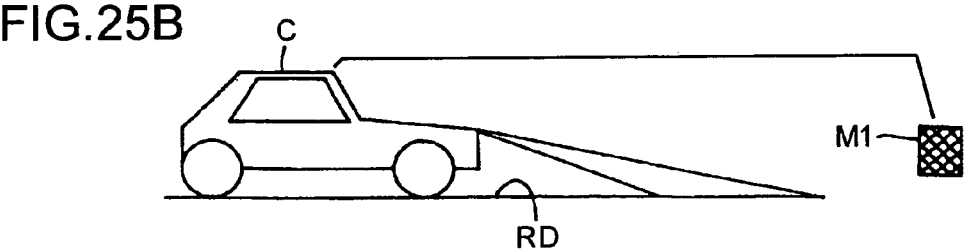
FIG. 25B is a schematic diagram for illustrating a state of the auto-leveling mark when a vehicle is running on a plain road.

The controller 6 determines that the vehicle C is running on the horizontal road surface and the like RD and moves the cut line CL of the light distribution pattern P5 for the vehicle passing-by the other vehicle in an arrow-D direction from the one-dot chain line to the thick line, i.e., downward, moves the cut line CL of the light distribution pattern P5 in an arrow-U direction from the broken line to the thick line, i.e., upward or maintains the state indicated by the thick line if the auto-leveling mark M1 based on the orientation signal from the CCD imaging device is shaped to be rectangular as shown in FIG. 25B.

Figure 25C:
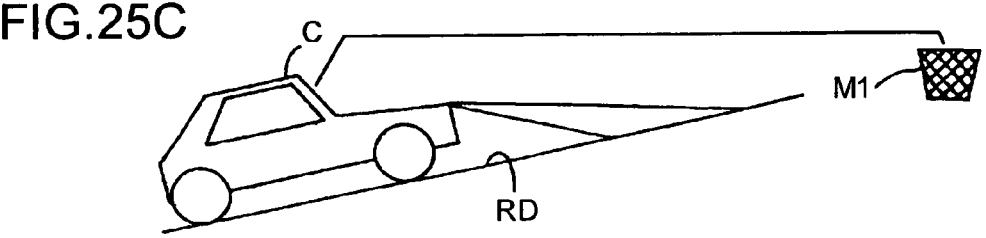
FIG. 25C is a schematic diagram for illustrating a state of the auto-leveling mark when a vehicle is running on an up-hill road.

The controller 6 determines that the vehicle C is running on the up-gradient road surface and the like RD and moves the cut line CL of the light distribution pattern P5 for the vehicle passing-by the other vehicle in the arrow-U direction from the thick line or the one-dot chain line to the broken line, i.e., downward or maintains the state indicated by the broken line if the auto-leveling mark M1 based on the orientation signal from the CCD imaging device is shaped to have the tapered lower end as shown in FIG. 25C.

The digital display apparatus according to the first modification of the first embodiment includes the CCD imaging device as the information acquisition unit 9. The digital display apparatus can thereby automatically, vertically move the cut line CL of the light distribution pattern P5 for the vehicle passing-by the other vehicle, i.e., perform so-called auto-leveling according to a vertical change in the orientation of the vehicle C. Besides, the digital display apparatus according to the first modification of the first embodiment grasps a deformation quantity of the auto-leveling mark M1 displayed in the light distribution pattern P5 for the vehicle passing-by the other vehicle as the variation of the orientation of the vehicle C. Therefore, it is unnecessary to provide the orientation sensor or the like that detects the orientation of the vehicle C and that outputs the orientation signal and manufacturing cost can be reduced, accordingly. The digital display apparatus according to the first modification of the first embodiment can dispense with the orientation sensor or the like and perform the auto-leveling by the digital lighting apparatus including the CCD imaging device that serves as the information acquisition unit 9 in a self-completive manner.

Figure 26:
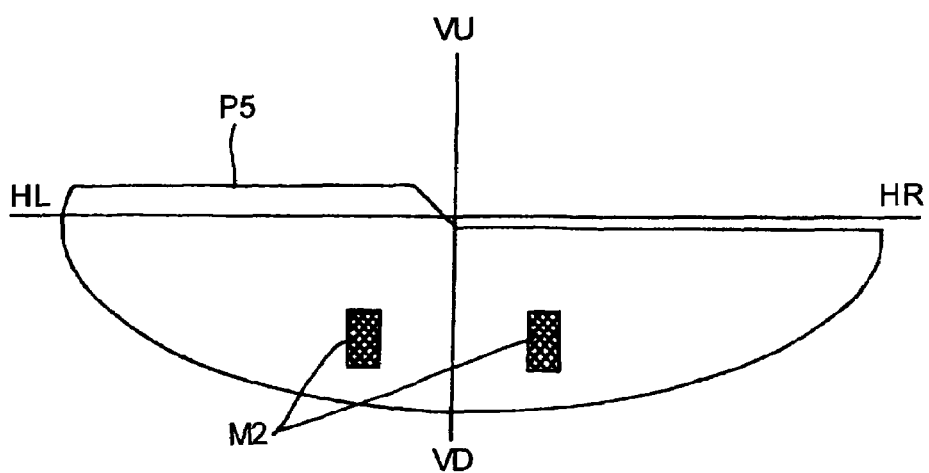
FIG. 26 is a schematic diagram for illustrating a light distribution pattern and a vehicle width mark of a digital display apparatus according to a second modification of the first embodiment.
Figure 27:
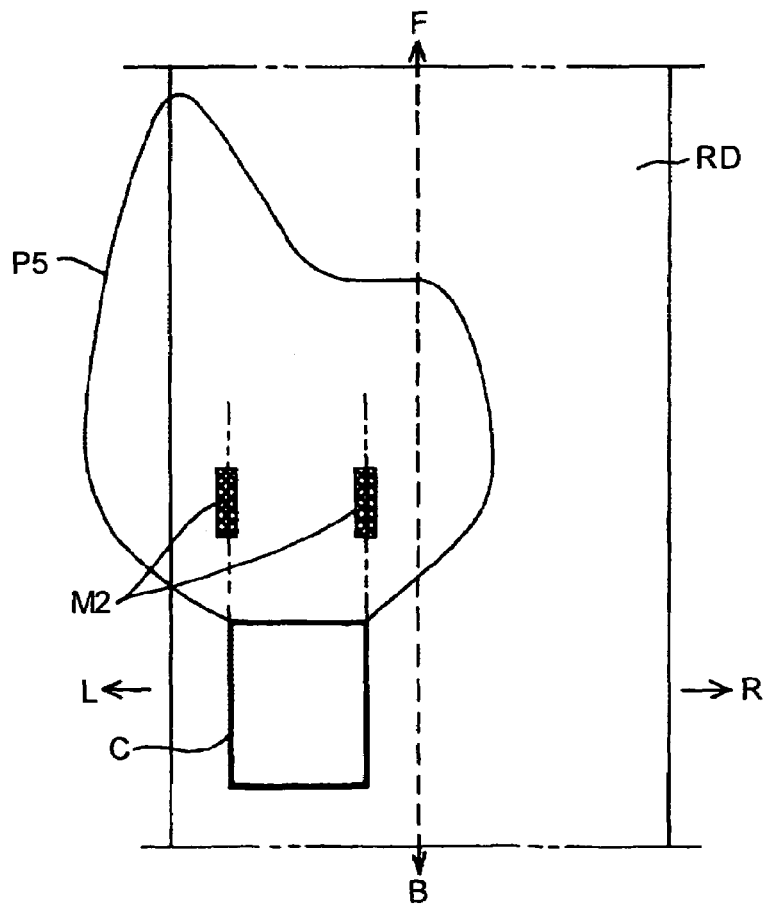
FIG. 27 is a schematic diagram for illustrating a state in which the vehicle width mark is displayed in a predetermined light distribution pattern that illuminates the road surface.

FIG. 26 and FIG. 27 are schematic diagrams of a digital display apparatus according to a second modification of the first embodiment. The same reference symbols as those in FIGS. 1 to 25C denote the same constituent elements.

In the digital display apparatus according to the second modification of the first embodiment, the information display unit 90 displays a vehicle width mark M2 that serves as the contrast information P in the predetermined light distribution pattern P5. As a result, the digital display apparatus according to the second modification of the first embodiment can grasp the vehicle width based on the vehicle width mark M2 and, therefore, the driver can grasp the information on surroundings of the vehicle C. Hence, the digital display apparatus according to the second modification of the first embodiment is preferable for traffic safety.

The digital display apparatus according to the second modification of the first embodiment can display such contrast information P as "WATCH DROPPINGS", "RAILROAD CROSSING IS QUITE NEAR", "WATCH STEEP CURVE", or "WATCH DOWNWARD PATH" by the information signal of the information acquisition unit 9.

FIG. 28 is a block diagram of a digital display apparatus according to a second embodiment of the present invention. The same reference symbols as those in FIGS. 1 to 27 denote the same constituent elements.

The digital display apparatus according to the first embodiment also serves as the digital lighting apparatus that illuminates the road surface and the like in the optimum light distribution pattern P5 for the surrounding environment of the vehicle. The digital lighting apparatus according to the second embodiment, by contrast, is a digital display apparatus separate from and independent of the digital lighting apparatus.

Namely, the digital display apparatus according to the first embodiment automatically selects the optimum predetermined light distribution pattern P5 for the surrounding environment of the vehicle using the storage unit 4, the surrounding environment detector 5, the surrounding environment determination unit 61, the data selection unit 62, and the like, The digital lighting apparatus according to the second embodiment displays information on the road and the like through the reflection type digital light deflector 2 based on th information signal from the information acquisition unit 9 by the information display unit 90.

Since the digital display apparatus according to the second embodiment can dispense with the storage unit 4, the surrounding environment detector 5, the surrounding environment determination unit 61, the data selection unit 62, and the like, the structure of the apparatus is simplified and manufacturing cost can be reduced, accordingly.

In the digital display apparatus according to the second embodiment, if the driver manually selects desired information and inputs the selected information in the information display unit 90 without using the information acquisition unit 9, the information (e.g., the leveling mark M1 or the vehicle width mark M2) can be irradiated and displayed on the road surface and the like.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital display apparatus for a vehicle, comprising:
an optical engine including a light source;
a reflection type digital light deflector that has a plurality of micro mirror elements arranged to be respectively tiltable, that digitally switches a tilt angle of each of the micro mirror elements between a first tilt angle and a second tilt angle to switch a reflection direction of light from the optical engine between a first reflection direction as an ON state and a second reflection direction as an OFF state;
a light irradiation unit that irradiates an ON state light reflected from the reflection type digital light deflector on a road surface; and
an information display unit that controls the reflection type digital light deflector, and that displays information using a contrast between the ON state light and the OFF state light reflected from the reflection type digital light deflector on the road surface via the light irradiation unit, the information is displayed in the OFF state within a main light distribution pattern displayed in the ON state on the road surface provided by the light irradiation unit; wherein the main light distribution pattern encloses the displayed information.

2. The digital display apparatus according to claim 1, further comprising:
an information acquisition unit that acquires environmental information surrounding the vehicle, and that outputs the environmental information acquired as an information signal, wherein
the information display unit controls the reflection type digital light deflector based on the information signal.

3. The digital display apparatus according to claim 2, wherein
the information acquisition unit is a global positioning system that outputs a position information signal.

4. The digital display apparatus according to claim 1, wherein
the information is displayed on the road surface within about 17 meters ahead in a direction of traveling of the vehicle.

5. The digital display apparatus according to claim 1, wherein the information is displayed on the road surface within about 14 meters ahead in a direction of traveling of the vehicle.

6. The digital display apparatus according to claim 1, wherein
the information is displayed on the road surface within a range from about 4 meters to about 17 meters ahead in a direction of traveling of the vehicle.

7. The digital display apparatus according to claim 1, wherein
the information includes at least one of a graphic, a symbol, a letter, a number, a leveling mark, and a mark that indicates width of the vehicle.

8. A digital display apparatus for a vehicle, comprising:
two optical engines, each of which includes a light source;
two reflection type digital light deflectors, each of which has a plurality of micro mirror elements arranged to be respectively tiltable, and digitally switches a tilt angle of each of the micro mirror elements between a first tilt angle and a second tilt angle to switch a reflection direction of light from the optical engines between a first reflection direction as an ON state and a second reflection direction as an OFF state;
two light irradiation units, each of which irradiates an ON state light reflected from the reflection type digital light deflectors on a road surface; and
an information display unit that controls the reflection type digital light deflectors, and that displays information using a contrast between the ON state light and an OFF state light reflected from the reflection type digital light deflectors on the road surface via the light irradiation units, wherein
one of the two reflection digital light deflectors forms the information with the OFF state light under control of the information display unit,
other of the two reflection digital light deflectors forms a non-lighting portion with the OFF state light under control of the information display unit, and
the information display unit displays the information and the non-lighting portion on the road surface via the light irradiation units so that the non-lighting portion surrounds the information.

9. The digital display apparatus according to claim 8, further comprising:
an information acquisition unit that acquires environmental information surrounding the vehicle, and that outputs the environmental information acquired as an information signal, wherein
the information display unit controls the reflection type digital light deflectors based on the information signal.

10. The digital display apparatus according to claim 9, wherein
the information acquisition unit is a global positioning system that outputs a position information signal.

11. The digital display apparatus according to claim 8, wherein
the information is displayed on the road surface within about 17 meters ahead in a direction of traveling of the vehicle.

12. The digital display apparatus according to claim 8, wherein
the information is displayed on the road surface within about 14 meters ahead in a direction of traveling of the vehicle.

13. The digital display apparatus according to claim 8, wherein
the information is displayed on the road surface within a range from about 4 meters to about 17 meters ahead in a direction of traveling of the vehicle.

14. The digital display apparatus according to claim 8, wherein
the information includes at least one of a graphic, a symbol, a letter, a number, a leveling mark, and a mark that indicates width of the vehicle.

15. A method of displaying information for a digital display apparatus for a vehicle, the digital display apparatus including two reflection type digital light deflectors, the method comprising:
calculating a polygon that is a shape of information to be displayed;
outputting the polygon to one of the reflection type digital light deflectors as a first control signal;
calculating a first rectangle that surrounds the polygon;
calculating a second rectangle that surrounds the first rectangle;
outputting the second rectangle to other of the reflection type digital light deflectors as a second control signal; and
displaying information that is formed by the one of the reflection type digital light deflectors based on the first control signal and a non-lighting portion formed by the other of the reflection type digital light deflectors based on the second control signal on a road surface so that the non-lighting portion surrounds the information; wherein the polygon is a non-lighting portion enclosed within the first rectangle of which the enclosing part is a lighting portion, and area between the first rectangle and the second rectangle is a lighting portion.

16. The method according to claim 15, further comprising:
acquiring environmental information surrounding the vehicle; and
outputting the environmental information acquired as an information signal, wherein
the information to be displayed is determined based on the information signal.

17. The method according to claim 15, wherein
the information is displayed on the road surface within about 17 meters ahead in a direction of traveling of the vehicle.

18. The method according to claim 15, wherein
the information is displayed on the road surface within about 14 meters ahead in a direction of traveling of the vehicle.

19. The method according to claim 15, wherein
the information is displayed on the road surface within a range from about 4 meters to about 17 meters ahead in a direction of traveling of the vehicle.

20. The method according to claim 15, wherein
the information includes at least one of a graphic, a symbol, a letter, a number, a leveling mark, and a mark that indicates width of the vehicle.

* * * * *